United States Patent
Jesadanont

[11] Patent Number: 5,810,417
[45] Date of Patent: Sep. 22, 1998

[54] AUTOMATIC SAFETY CAR SEATS AND SHEET-TYPE SAFETY-BELT

[76] Inventor: Mongkol Jesadanont, Faculty of Pharm. Sciences, Chulalongkorn U., Phyathai Rd., BKK 10330, Thailand

[21] Appl. No.: 535,868

[22] Filed: Sep. 28, 1995

[51] Int. Cl.⁶ ........................................... B60N 2/02
[52] U.S. Cl. ..................... 296/68.1; 297/216.13
[58] Field of Search .................. 296/65.1, 68.1; 297/468, 469, 470, 216.13

[56] References Cited

U.S. PATENT DOCUMENTS

| | | | |
|---|---|---|---|
| 2,818,909 | 1/1958 | Burnett | 155/9 |
| 2,823,730 | 2/1958 | Lawrence | 155/9 |
| 3,578,376 | 5/1971 | Hasegawa | 296/65 |
| 3,610,679 | 10/1971 | Amato | 296/65 A |
| 3,762,505 | 10/1973 | Morse | 188/1 C |
| 3,957,304 | 5/1976 | Koutsky et al. | 297/385 |
| 3,998,291 | 12/1976 | Davis | 180/91 |
| 4,657,297 | 4/1987 | Ishibashi | 296/63 |
| 4,819,278 | 4/1989 | Ramos | 4/254 |
| 4,909,539 | 3/1990 | Morner . | |
| 4,946,197 | 8/1990 | Matsui et al. . | |
| 5,011,181 | 4/1991 | Laucht et al. . | |
| 5,031,929 | 7/1991 | Henseler . | |
| 5,203,600 | 4/1993 | Watanabe et al. | 296/68.1 |
| 5,251,931 | 10/1993 | Semchena et al. . | |
| 5,288,104 | 2/1994 | Chen . | |
| 5,330,228 | 7/1994 | Krebs et al. . | |
| 5,338,090 | 8/1994 | Simpson et al. . | |
| 5,340,185 | 8/1994 | Vollmer . | |
| 5,407,244 | 4/1995 | Nakano et al. | 296/68.1 |
| 5,409,262 | 4/1995 | McLennan . | |
| 5,411,319 | 5/1995 | Kuiri . | |
| 5,449,214 | 9/1995 | Totani | 296/68.1 |
| 5,513,897 | 5/1996 | Lemmen | 297/410 |

FOREIGN PATENT DOCUMENTS 0 529 265 A1  7/1992  European Pat. Off. .

*Primary Examiner*—David M. Mitchell
*Assistant Examiner*—Jonathan Yun

[57] ABSTRACT

The automatic seats in a vehicle are designed to minimize the seriousness of car-crash injuries during a frontal collision. When the vehicle collides against the other vehicle or any other stationary objects at a relative velocity of 40 Km/h or up, the backrest is pushed to recline backward by the action of the springs together with various mechanisms especially designed. Spring of either torsion type or tension type is used. The collision results in pulling the upper part of the body of the driver or the occupants fastened by the designed safety-belts to recline backwards. Thus, the pelvis, the chest and the head of an occupant sitting on this automatic safety car seat are moved away to the farmost and thus, can avoid striking with the deforming frontal parts of the car intruding by the frontal collision. The chest injuries and the brain damage can then be effectively avoided. The automatic safety seats in the vehicle are designed slightly different for either the front seat passengers or the rearseat passengers where modification is necessary for the rearseat. The seat-belts are specially designed to help dissipating the impact energy of the collision to minimize harm to the upper part of occupant's body fastened.

2 Claims, 30 Drawing Sheets

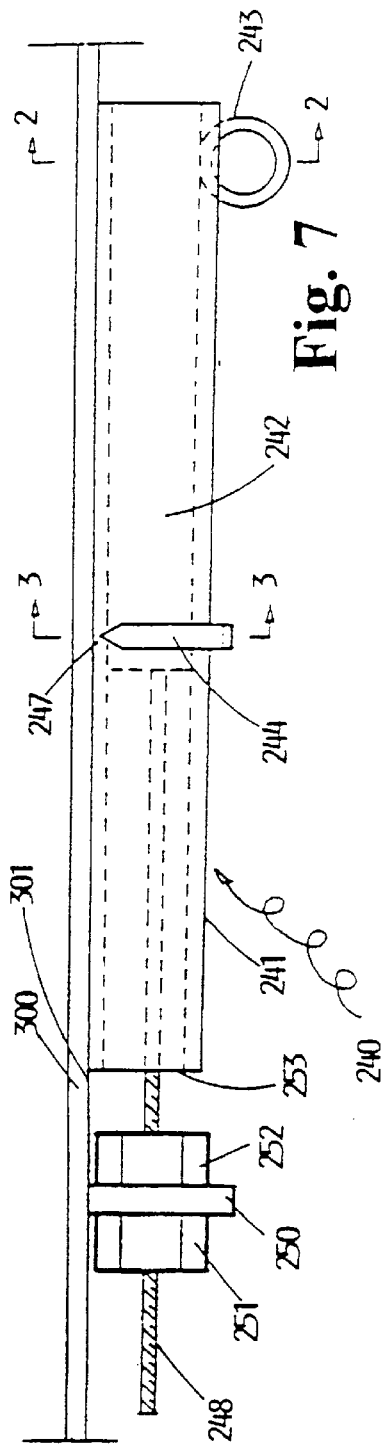
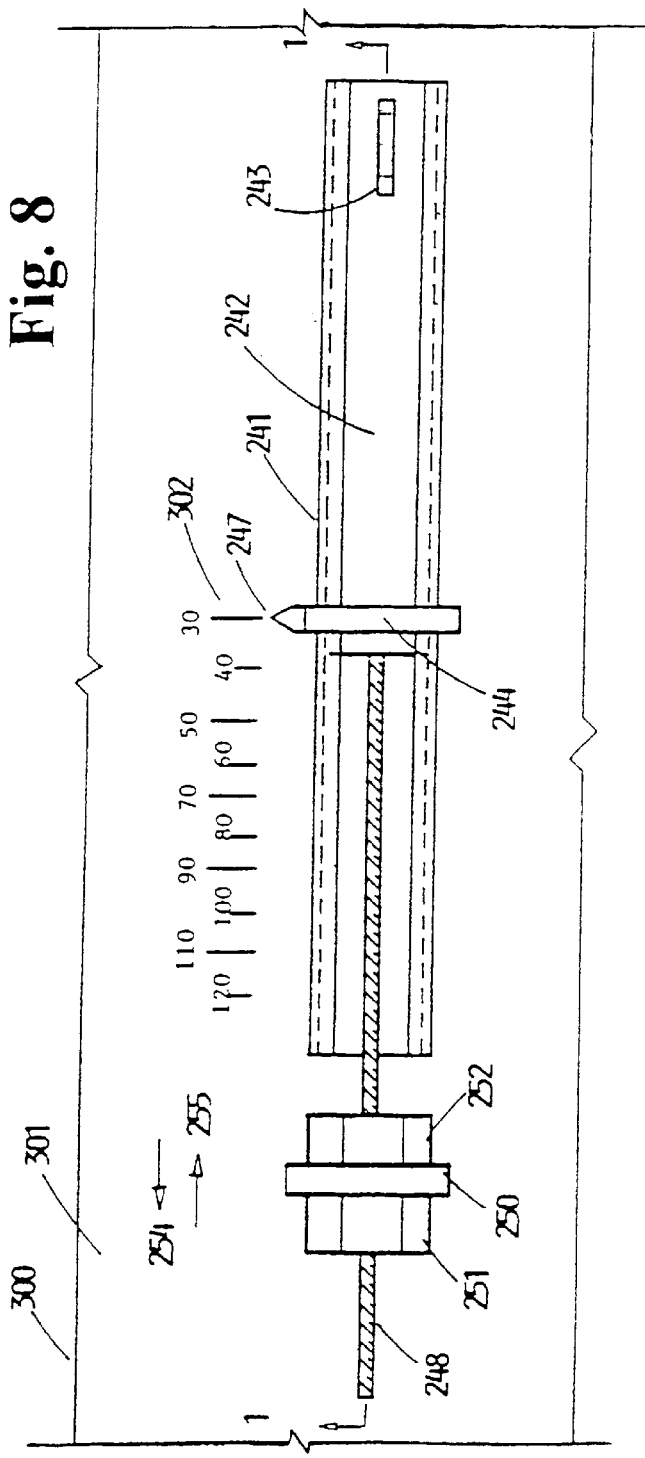
Fig. 7
Fig. 8

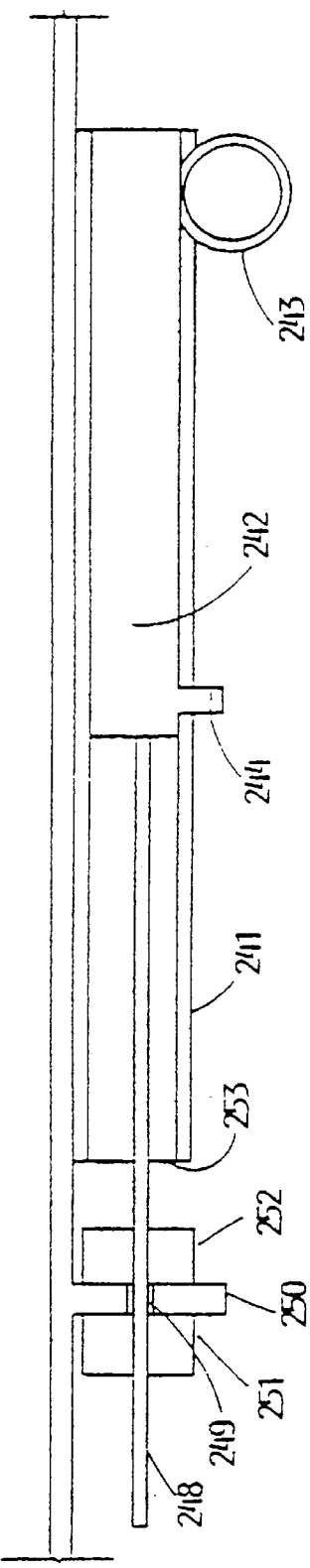
Fig. 9
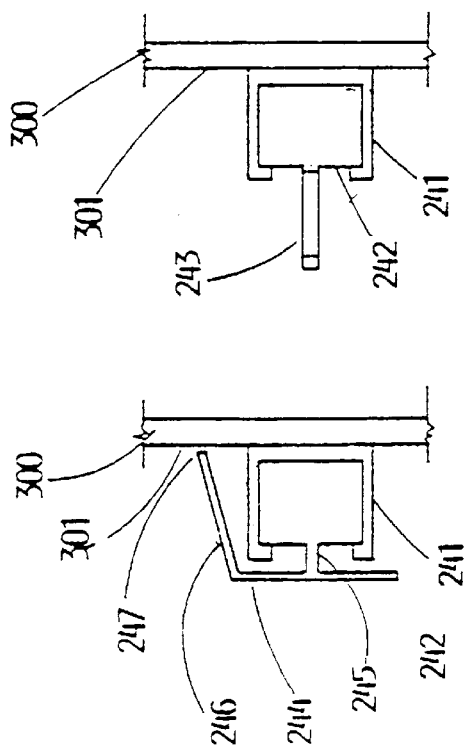
Fig. 9A
Fig. 9B

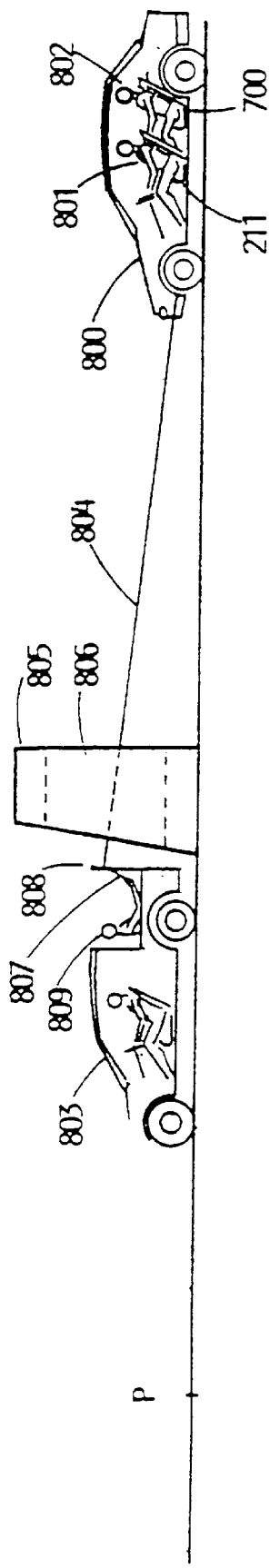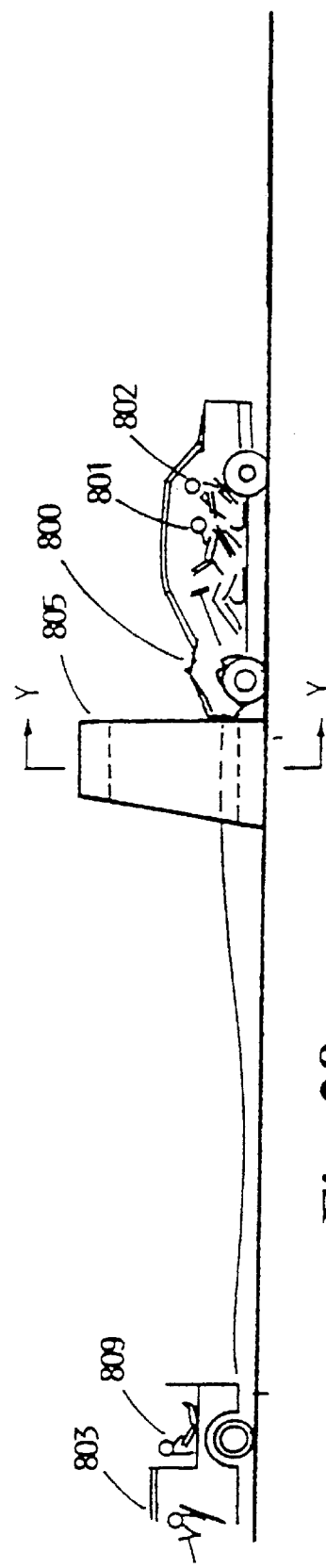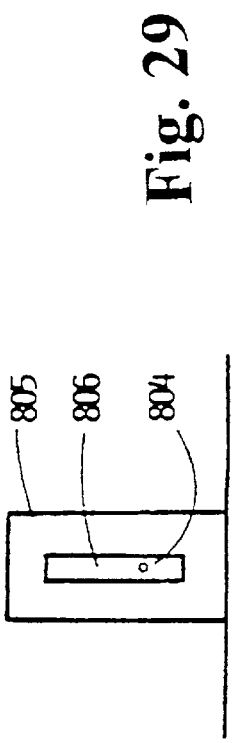
Fig. 27
Fig. 28
Fig. 29

PRIOR ART

AUTOMATIC SAFETY CAR SEATS AND SHEET-TYPE SAFETY-BELT

BACKGROUND

In an event of a frontal collision, the front part of the car shows high degree of deformation which forces the steering column together with the instrument panel inwards. The steering wheel is often pushed downwards. Accordingly, several safety features have been developed over the past years in attempt to reduce serious injuries to the vehicle occupants. Numerous safety devices such as the seat-belts with various modifications (U.S. Pat. Nos. 5,411,319; 5,330, 228; 5,288,104; 4,946,197; 4,909,539 and EP 0 529 265 A1), and the air bags (U.S. Pat. Nos. 5,409,262; 5,288,104; 5,251,931 and 5,011,181) have been used. Those air bags although have been provided variously of so many different designs, they are mostly installed in the interior of the steering wheel assembly which is a point most prone to serious damage upon a car accident of frontal collision type. Many of them are actuated electronically whose function can be easily damaged during a collision. These all reasons when put together result in surprisingly too many reports on functioning failure of the air bag system. In addition, although the air bag is supposed to absorb the impact energy created during the collision and reduces the severity of injuries to the human body, this is found not to be always true. Due to the fact that at high speeds as high as or over 40 Km/h upon collision, the impact is so great that the air bag itself can cause damage to the occupant's body and visceral organs especially in the thoracic portion. Only short time after the air bag restraint systems have been introduced in the market, it has been very well realized that air bags are quite poor device to minimize the damages to the occupant's body. Improvement and alternatives have been therefore variously proposed with the center of interest pointed at the design of the vehicle seats in attempt to minimize the damage on the occupant's body. The new concept currently and presently proposed is to bring the occupant's body especially the upper part and the head away backwards the farmost possible to avoid striking with the incoming deforming frontal part of the car such that damages to the brain and the thoracic portion of the occupant can be minimized. Various designs of the vehicle seats have been proposed. Many lifting mechanisms have been described (U.S. Pat. No. 5,340,185 and German patent document DE-OS 33 37 232) for raising a front or leading edge section of a seat cushion. The assembly is connected to the lifting mechanism via different means, so that during a significant frontal impact to the vehicle, the front edge section of the seat is raised. A French patent document FR-PS 1 012 718 describes how to tip a vehicle seat backwards, about a transverse axis of the motor vehicle. In the event of a frontal impact, a connecting rod is moved into the passenger compartment and detaches the seat from its front support, hence tipping the seat such that it rotates backwards about a transverse axis passing through the rear seat support. Since the connecting rod itself is prone to bending and jamming during its rearward movement, the actuation is thus unreliable. Furthermore, the connecting rod itself can be a serious safety hazard to the occupant while penetrating into the passenger compartment to detach the seat from its front support. Another German patent document DE-PS 36 31 881 discloses a vehicle seat whose front edge section is stiffened during a significant frontal impact to the vehicle. The stiffening action is achieved by a rather complex mechanism involving a stretching gear, a pyrotechnical drive, several actuating cables and more, which is rather too elaborate and costly. In fact, the more complex a system is, the more likely it will fail to function at the moment the action is needed as if there is just a small damage to only one single component of the whole system. Yet another French Patent FR-A 2 261 158 describes a prior art safety mechanism for a vehicle seat using a lifting mechanism to raise the front edge section of a vehicle seat to improve the supporting action of the seat cushion by enlarging the effective wedge angle. A support is provided with one end hinged to the stationary pivot joint attached to a seat support connection disposed on a lower middle portion of the seat cushion. The support is held by a spring to be in a lowered operating position. During a frontal collision, the seat moves forward by an inertia force associated with the seat and the passenger sitting thereon which overcomes the spring force. The support is then pivoted generally upward and thereby the seat's front edge. These all patents describing the lifting front edge of a vehicle seat suffer from the fact that upon lifting the front edge of a seat, the knees and the legs of the occupant are also lifted up to the level prone to being seriously injured by the intruding front panel. In addition, the knees and the legs and the airbag, if any, would be compressed onto the occupant's upper portion and thus may cause unnecessary additional serious injuries. In Japanese Patent Second Provisional Publication 61-35017 and Japanese Utility Model First Provisional Publication 3-26652, various seats have been disclosed using the reinforcing members installed in seat cushions and/or seatbacks to reinforce them. Such reinforced seats quite often have failed to exhibit the desired performance, in addition to making it uncomfortable for an occupant to sit on. Yet, another U.S. Pat. No. 5,407,244 discloses a safety seat and a safety arrangement of seats which can protect a seat occupant during a side-on vehicle collision. An electric-powered reclining device is used for pivoting the seatback connected to a rear end of the seat cushion to a desired angular position relative to the cushion. A microprocessor is used to control the power reclining device by limiting the angular position of the seatback of the second seat together with the seated occupant or to pivot the seatback of the second seat angularly corresponds to that of the first seat when no occupant on the second seat. Their system, however, is too complicated and operates electronically intended to provide safety during a side-on collision. The complexity of the system makes it questionable whether it would function properly to serve the invention purpose if a sudden action is needed where the great impact occurs might disturb all the electronic functions.

While the U.S. Pat. No. 5,338,090 relates to a leg structure of a vehicle seat for absorbing a striking or impact energy exerted on a seat, the U.S. Pat. No. 5,409,262 discloses a safety system allowing a vehicle to collapse upon impact to absorb such impact energy with a seat tilting mechanism connected to the rear frame to tilt the passenger seat rearwardly. In the latter patent, a hood deflector is actuated to deflect the hood upwards acting as an additional barrier against any objects entering the passenger compartment. These patents described are all focused at bringing away the body of the occupant rearwards. The former one may be able to tilt the seat rearwards for only a too limit distance and the latter one is too costly in design.

Accordingly, a need for a simple, inexpensive, yet highly effective means to minimize the severity of the injuries to an occupant in a vehicle upon a frontal collision has to be fulfilled since no type of accident reportedly represents a greater hazard to drivers and all the occupants than a frontal collision where the car body and the occupants encounter extreme loads. The present invention proposes herein a system to fulfill such need which can overcome all the above mentioned problems of the prior arts. By the action of the two springs flanking both sides of a vehicle seat and connecting to its backrest, during a significant frontal impact to a vehicle, the backrest together with its occupant fastened onto with the presently designed seat-belts, can be suddenly pushed rearwards to recline to the farmost position, thus striking of the head and the upper part of the occupant's body can be avoided successfully and effectively by a rather inexpensive mechanism. There is no need for any electronic or electrical devices. The mechanism involves only the simple mechanical and dynamic means by a well and skillful designed spring set connecting between the rear end of the seat cushion and the lower portion of its backrest.

SUMMARY OF THE INVENTION

The automatic seats in a vehicle designed to minimize the seriousness of car-crash injuries during a frontal collision are described. A seat cushion is connected at its posterior end to a backrest whose two flanking steel bars each having a circular hole fits pivotally onto a cylindrical shaft protruding upright on the surface of each of the two thick steel plates mounted under the left and the right edges of the seat cushion. The backrest is held slightly reclining tightly in place via a spring of predetermined stiffness. Spring of either torsion type or tension type can be used. When the vehicle collides against the other vehicle or any other stationary object at a relative velocity of 40 Km/h or up, the backrest is pushed to recline backward by the action of the springs together with various mechanisms especially designed. The collision results in pulling the upper part of the body of the driver or the occupants fastened by the presently designed safety-belts to recline backwards to the rearmost. Thus, the pelvis, the chest and the head of an occupant sitting on this automatic safety car seat are moved away to the farmost and thus, can avoid striking with the deforming frontal parts of the car intruding by the frontal collision. The chest injuries and the brain damage can then be effectively avoided. The automatic safety seats in the vehicle are designed slightly different for either the front seat passengers or the rearseat passengers where modification is necessary for the rearseat. A sheet-type safety-belt is also specially designed to help dissipating the impact energy of the collision to minimize harm to the upper part of occupant's body fastened.

BRIEF DESCRIPTION OF THE DRAWINGS

FIG. 7 is a top-view of the force-adjusting set;

FIG. 8 is a side view of FIG. 7 showing the scale with the numbers labeled indicating the different body weights of the occupants on the automatic seat;

FIG. 9 is a sectional view of FIG. 7 along line 1—1 of FIG. 8;

FIG. 9A is a sectional view of a slidable steel bar at a position where a closed circular loop is mounted onto, along line 2—2 of FIG. 8;

FIG. 9B is a sectional view of a slidable steel bar at a position where a cursor is mounted onto, along line 3—3 of FIG. 8;

FIG. 27 shows the testing of the function of the present automatic safety car seats, at the beginning;

FIG. 28 shows the car after collided at the front to a rigid wall, the occupants in both the front and the rear compartments are pulled to recline backward to the rearmost, after the collision occurred at 40 Km/h or up;

FIG. 29 is the sectional view of the wall used in the testing along the line Y—Y in FIG. 28;

Figure 1:
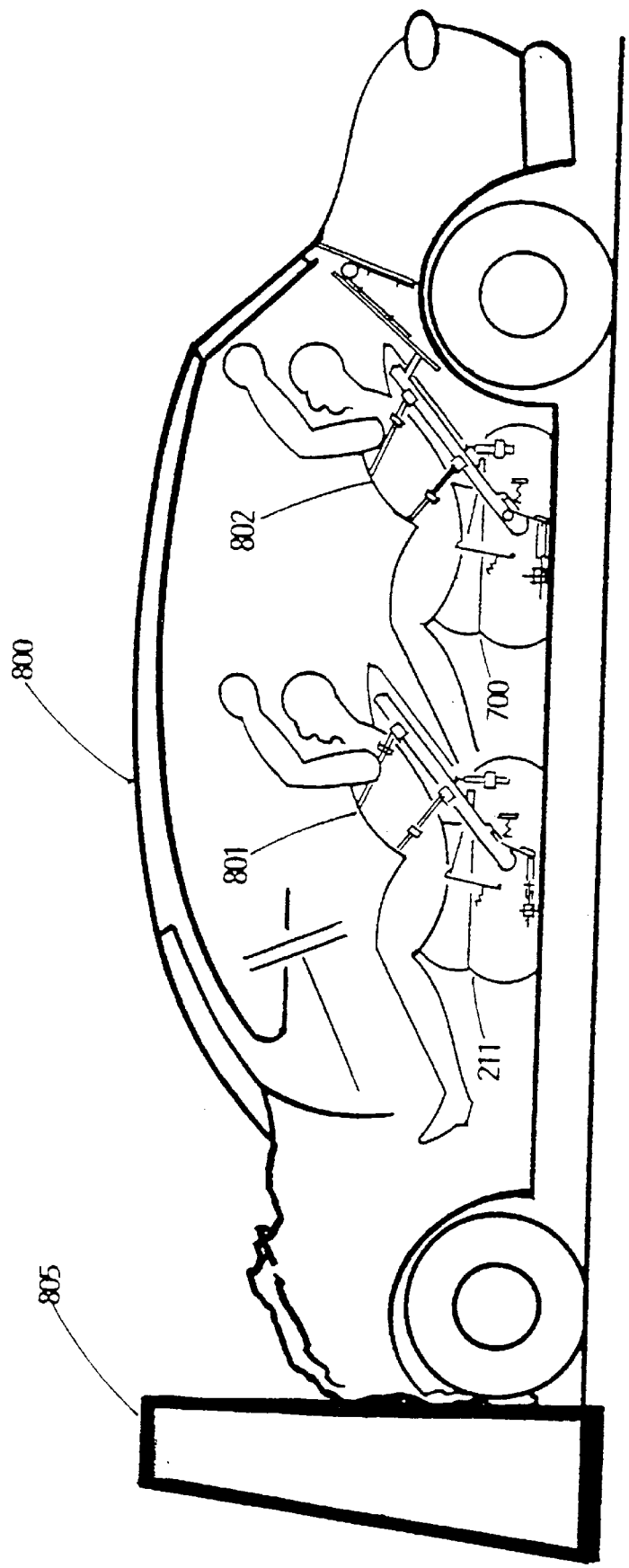
FIG. 1 shows the occupants, sitting on the automatic safety car seats of the present invention both in the front and the rear compartments of the car, are drawn to recline backward when the frontal collision occurs at a vehicle velocity of 40 Km/h or up.

DESCRIPTION OF THE PREFERRED EMBODIMENTS:

The present inventions are the automatic safety car seats for front and rear compartment of a vehicle and a sheet-type safety-belt designed for minimizing the seriousness of collision injuries. This should be the best passive safety devices to provide in the car. Upon a frontal collision of the vehicle, the backrests are pulled to recline backward to the rearmost. This movement pulls the upper part of the occupants' bodies, from pelvis up to head, fastened by the presently designed sheet-type safety-belts to the backrest to recline backward to the rearmost. Therefore, the pelvis, the chest and the head of the occupants are moved away from the intruding deforming steering wheel or the intruding frontal parts of the car. Thus, hitting of the head with the steering wheel which occurs in most car collision even in the best designed cars and causes most of the time serious brain damage and death can be avoided. Even the backseat occupants, from their pelvis up to their heads, can avoid hitting against the reclining front seat backrests. As shown in FIG. 1, the backrests of all car seats both at the front and the rear compartments recline instantaneously right after the collision occurred at 40 Km/h or up;

In an event of frontal collision, the safety standard considered by most automobile manufacturers presently would regard the velocity of 45 Km/h to be the safest velocity to all the occupants fastened with the seat-belts, with or without the air bag. At a collision velocity greater than 45 Km/h, the situation is regarded as a severe collision such that the occupant may be seriously injured or even fatal.

The present invention of the automatic safety seat in the vehicle is to minimize the severity of injuring to all the occupants in the vehicle in an event of frontal collision at a velocity of 40 Km/h or up where this lowest velocity may be reduced to any velocity such as 30 Km/h depends on the presetting of various parameters such as the stiffness of the spring and the adjustment of the initial force within the spring.

In what has been described above and to be described further,

1. 'The relative velocity' means a velocity resulting from the frontal collision of a car.

For example, a car is moving at a velocity 25 Km/h, an occupant in this car is also moving at 25 Km/h. In an event of frontal collision to another car moving in an opposite direction at 15 Km/h, 'the relative velocity' of the car and its occupant resulting from the collision is then equal to 25+15= 40 Km/h. If a car together with its occupant are moving at a velocity of 40 Km/h and the car collides against a rigid wall (having a velocity of 0), 'the relative velocity' of the car or its occupant resulting from the collision is then equal to 40+0=40 Km/h.

"If the car collides at a collision velocity of 40 Km/h" means that the collision occurs at 'the relative velocity' of the car or its occupant of 40 Km/h.

"If the car collides at a collision velocity above 40 Km/h" means that the collision occurs at 'the relative velocity' of the car or its occupant of over 40 Km/h.

"If the car collides at a collision velocity of 40 Km/h or up" means that the collision occurs at 'the relative velocity' of the car or its occupant of 40 Km/h or up.

2. 'Collision' means frontal collision.
3. 'The steel bars 214' means both steel bars 214A and 214B.
4. 'The safety-belts 216 to fasten the chest of the occupant' means both safety-belts 216A and 216B.
5. 'The safety-belts 218 to fasten the pelvis of the occupant' means both safety-belts 218A and 218B.
6. 'The safety-belts' means both safety-belts 216 and 218.
7. 'The strap locks 219' means both strap locks 219A and 219B.
8. 'The automatic tensioner sets' means both seat-belt tensioner sets 212A and 212B.

There are two kinds of the presently designed automatic safety car seats:

1. an automatic safety car seats for occupants in the front compartment of the car, i.e. the driver and the front seat occupant(s); and
2. an automatic safety car seats for occupants in the rear compartment of the car.

The important mechanism of this invention is the spring used which can be one of either of the two types below:

1. a torsion spring, or
2. a tension spring, or any other elastics or other mechanisms that can serve the same purpose can also be used.

The details of each type of the two kinds of automatic safety car seats are described.

Figure 2:
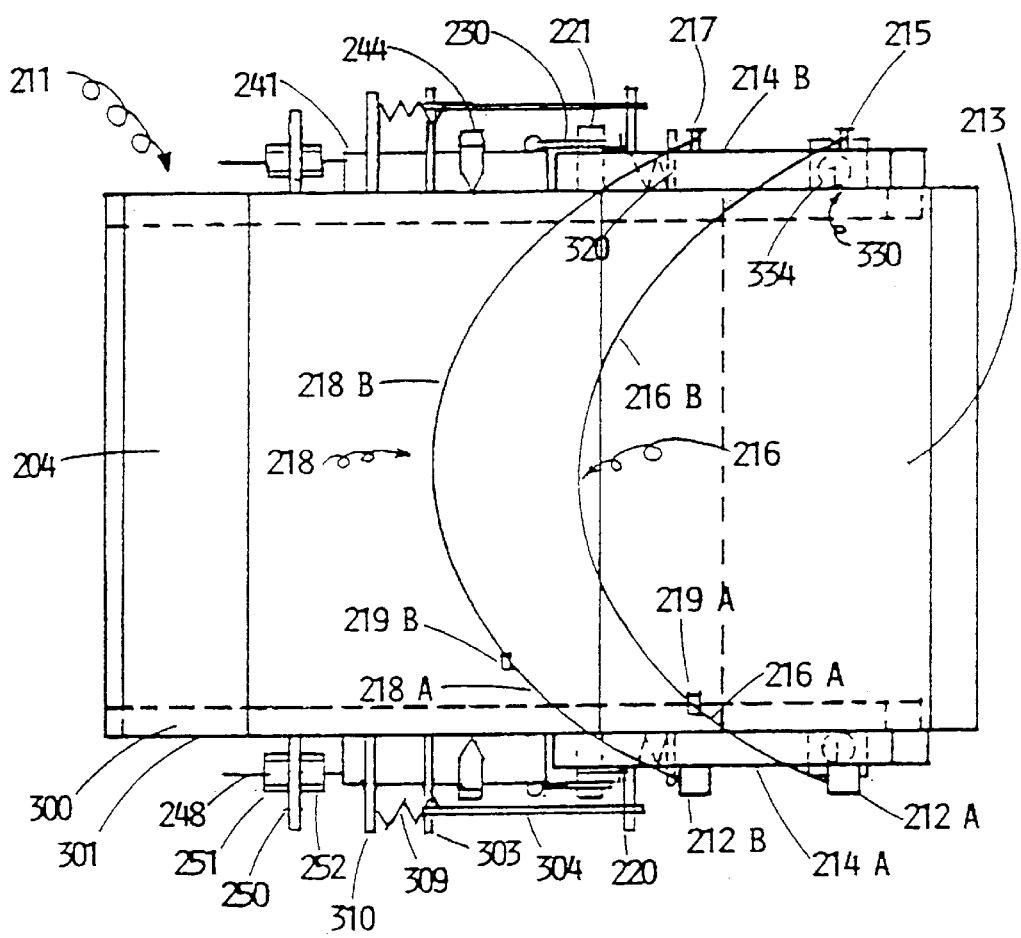
FIG. 2 is a top-view of the automatic safety car seat using the torsion spring sets for front seat occupant showing the locations of all the mechanisms.
Figure 3:
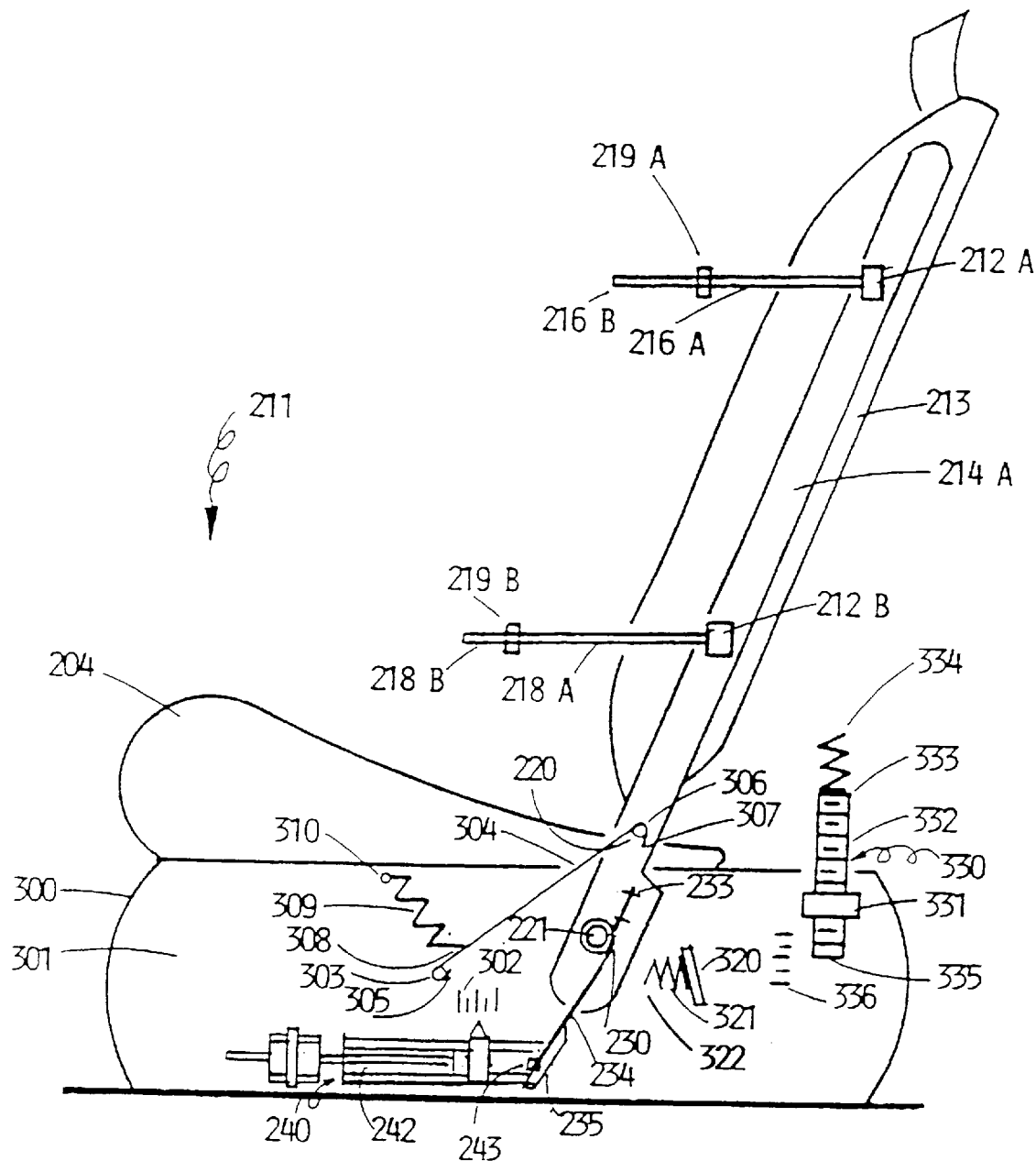
FIG. 3 is a left-sided view of FIG. 2.
Figure 4:
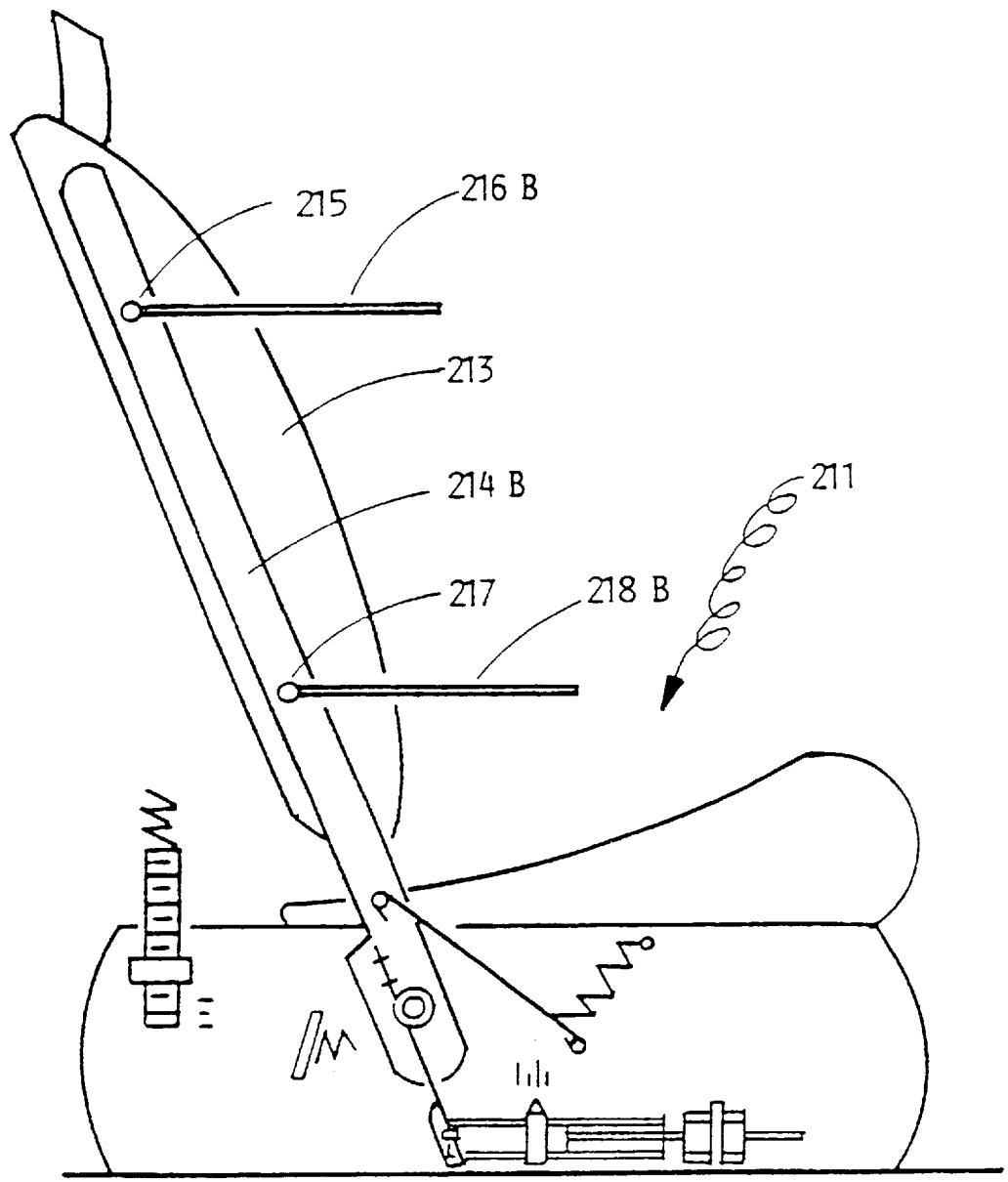
FIG. 4 is a right-sided view of FIG. 2.

An Automatic Safety Car Seats for Occupants in the Front Compartment of the Car using the Torsion Spring FIGS. 2, 3, and 4 show an automatic safety car seat 211 of the present invention. All parts of the seat except the seat cushion, the backrest, and the safety-belts are made of steel. The backrest 213 is fixed between two long rectangular steel bars, 214A and 214B on the left side and the right side of the occupant, respectively.

As in FIG. 3 on the steel bar 214A at the level of the occupant's chest, there is a conventional automatic seat-belt tensioner set, 212A where the inner end of the safety-belt 216A is spooled inside with outer end extended outside the tensioner. This automatic seat-belt tensioner set, 212A is used for the safety-belt at the chest level of the occupant. At the pelvis level of the occupant, there is another conventional automatic seat-belt tensioner set, 212B fixed to the rectangular steel bar 214A where the inner end of the safety-belt 218A is spooled inside with outer end extended outside the tensioner. This automatic seat-belt tensioner set, 212B is used for the safety-belt at the pelvis level of the occupant. Both automatic seat-belt tensioners are of conventional type and would function to restrain the occupant to the backrest when the collision occurs at about 10 Km/h or up.

FIG. 4 shows the steel bar 214B on the right side of the automatic seat 211. At the same level of the automatic seat-belt tensioner set 212A, there is a short steel axle 215 protruding upright on the side of the steel bar 214B opposite to the backrest. A safety-belt 216B is fixed to this steel axle 215 and connected to safety-belt 216A by a strap lock 219A as shown in FIGS. 2 and 3.

A short steel axle 217 is protruding upright on the side of the steel bar 214B opposite to the backrest at the same level as the automatic seat-belt tensioner 212B at the pelvis level to which a safety-belt 218B is fixed. The safety-belt 218B is connected to the safety-belt 218A through a strap lock 219B.

Thus, the steel bar 214A has two automatic seat-belt tensioner sets 212A and 212B fixed to it while the steel bar 214B has only the two short steel axles laterally protruding out. These are the only differences between the two steel bars 214A and 214B, otherwise all the other components of the two bars are the same which are to be described below.

Next below the short steel axle 217 or the automatic seat-belt tensioner set 212B, there is a steel axle 220 protruding laterally from each steel bar 214. Next below the steel axle 220, there is a circular hole 222 at lower end of steel bar 214.

As shown in FIGS. 2, 3 and 4, there are two thick steel plates 300, each tightly supports under each side on the left or the right of the seat cushion 204 and vertically mounted tightly to the floor of the car. Both steel plates 300 and each of their mechanical parts on their surface 301 to be described below are in duplicate.

On the surface 301 of the steel plate 300 each on both side of the seat, there is a steel axle 303 protruding upright. A steel hook 304 has its lower end 305 wound round the axle 303 such that this hook 304 can move freely around axle 303. The curving end 306 of the hook 304 is engaged to the steel axle 220 such that the tipping end 307 of this curving end 306 points downward.

Approximately at the middle of hook 304, a tension spring 309 is fixed to the position 308 on hook 304. The other end of this spring 309 winds round a short axle 310 protruding also upright from flat surface 301 of the steel plate 300 such that the spring 309 can move pivotally around axle 310.

The tension force in the tension spring 309 is great enough to draw the hook 304 away when the curving end 306 is disengaged from the steel axle 220.

At the lowest end of the steel bar 214 next below the axle 220, the circular hole 222 (FIGS. 5 and 6) fits pivotally onto a cylindrical steel shaft 221. The diameter of the circular hole 222 is slightly greater than the diameter of the cylindrical steel shaft 221 to allow pivotal movement of the steel bar 214 around steel shaft 221.

This cylindrical steel shaft 221 is part of the steel plate 300 which protrudes out laterally and perpendicularly to the plate 300. The thickness of the steel plate 300 is at least 1 centimeter.

The cylindrical steel shaft 221 must be long enough such that it must protrude out laterally through the thickness of the steel bar 214 and the whole thickness of spring coils 231 of a torsion spring set 230 and at least a length of one centimeter of the steel shaft 221 is protruding outside the spring coils 231. This allows the spring coils 231 to be held around the steel shaft 221 at all time and not slipped off during functioning. From FIG. 5 which is the enlarged top-view picture and FIG. 6 which is the enlarged side-view picture, the spring coils 231 of the torsion spring set 230 is shown to wind round the cylindrical steel shaft 221. The inner diameter of the spring coils 231 must be greater than the diameter of the cylindrical steel shaft 221 such that this would allow free movement of the torsion spring set 230 around steel shaft 221 during the twisting of the spring coils 231 by any torsion force.

Figure 6:
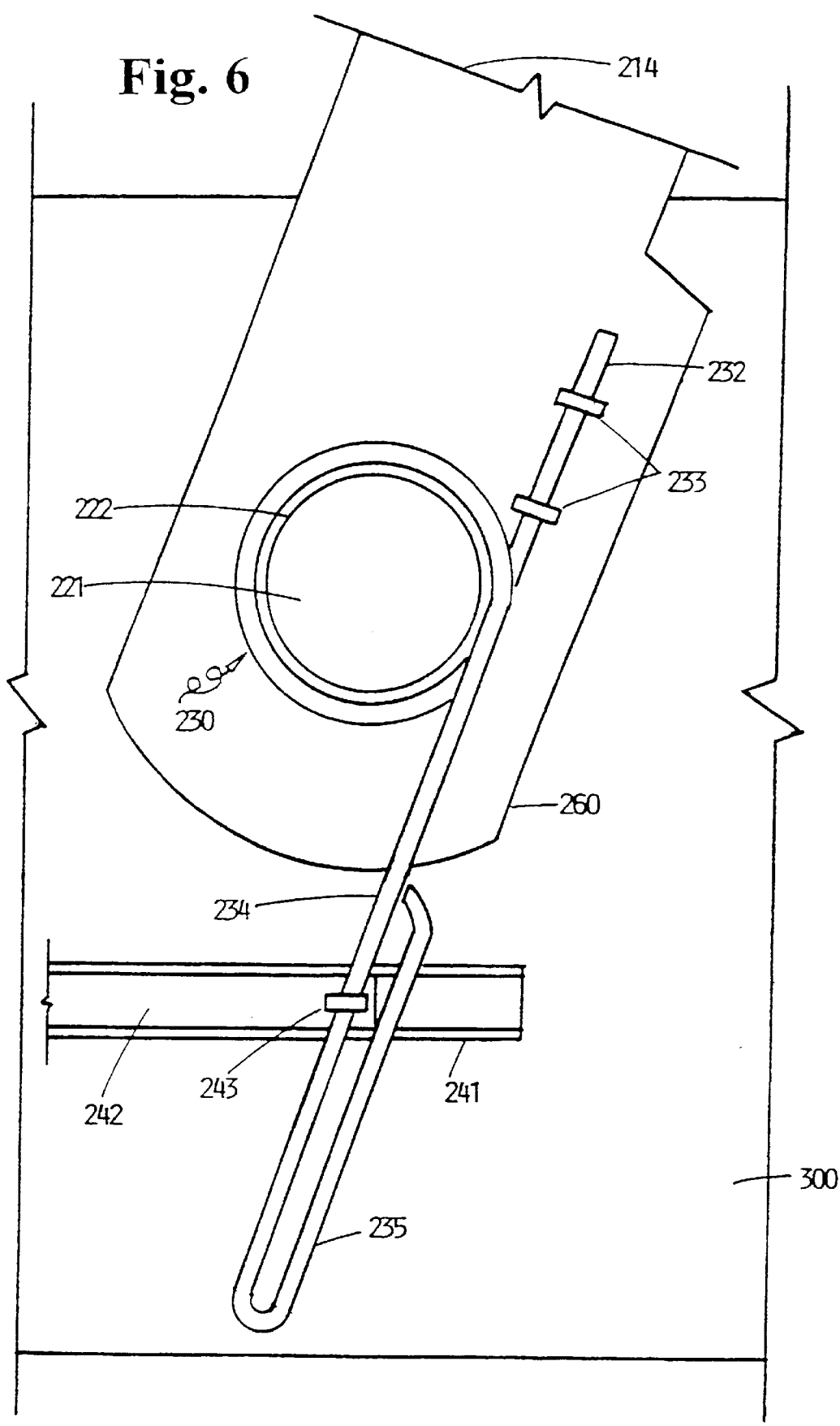
FIG. 6 is a left-sided view of FIG. 5.
Figure 18:
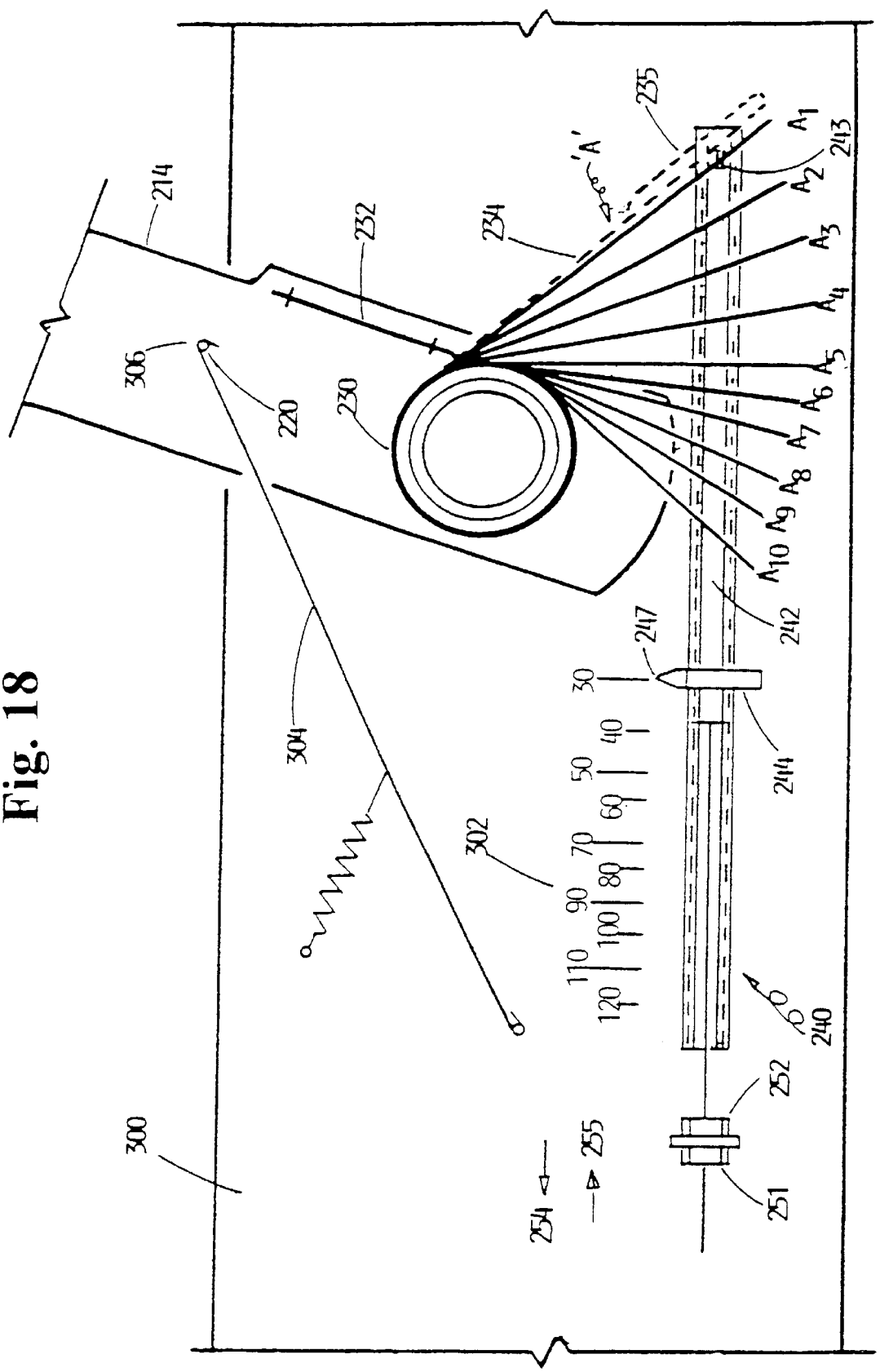
FIG. 18 shows how to draw a scale for adjusting the initial torsion forces in the torsion spring set corresponding to the different body weights of the occupants sitting on the automatic safety car seat.

The torsion spring set 230 (FIG. 6) has one upper straight arm 232 fixed tightly on and parallelly to the steel bar 214 by two clamps 233. Thus, at any angle to the horizontal the steel bar moves, this straight arm 232 is moved to the same angle. The lower end of the torsion spring set 230 is also a straight arm 234 whose end is a long loop 235 as shown in FIG. 6. This long loop 235 is engaged to a closed-circular loop 243 of a force-adjusting set 240. The loop 235 is designed to be of a long loop-type to allow free movement during the force adjusting action (FIG. 18).

Figure 5:
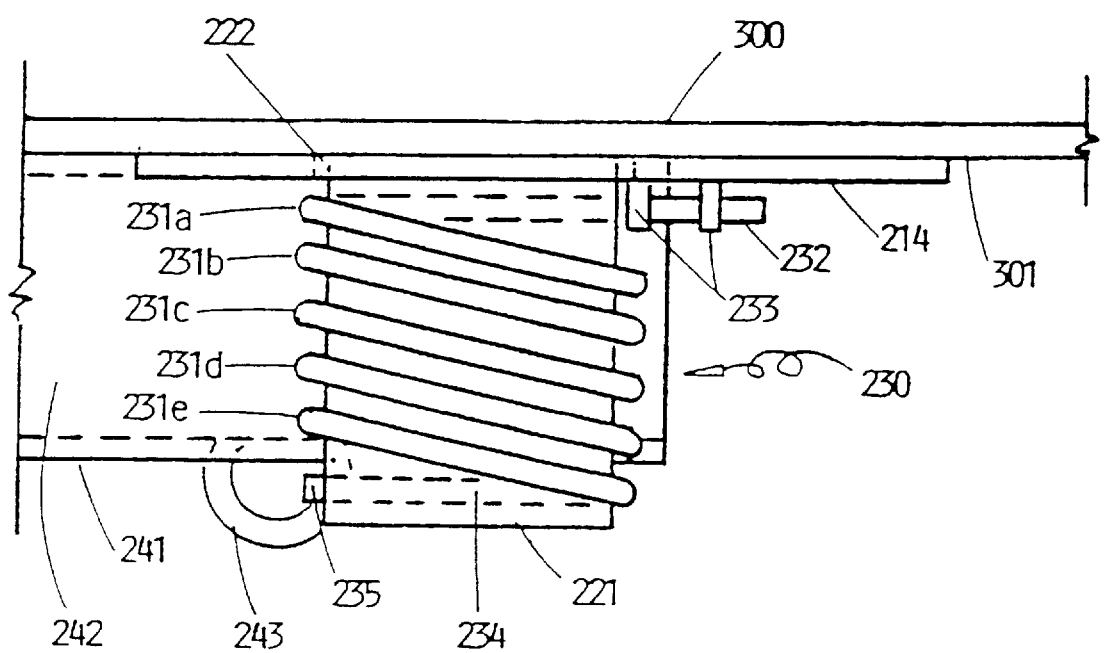
FIG. 5 is an enlarged top-view of the torsion spring set used in the automatic safety car seat either in the front or the rear compartment.

As in FIGS. 5 and 6, arm 232 and arm 234 are extended parts of the unactive coils 231a and 231e of the torsion spring set 230, respectively.

In the present invention, the torsion spring set 230 has a total of 5 spring coils where the first coil 231a with its extended arm 232, while coil no. 5 is the last coil 231e with its extended arm 234. These two coils 231a and 231e are unactive coils which are the coil members of the spring set 230 whose lengths are constant when a external force is exerted on the spring set 230. The arms 232 and 234 are straight at all times without bending. The main function of these two unactive coils is to transfer the external force from or to the three remaining coils of the torsion spring set 230, i.e., coils 231b–231d which are called the 'active coils'. The main function of the active coils is to receive or transfer the external force(s) from or to the other mechanisms.

On the surface 301 of each steel plate 300, next below and anterior to the steel bar 214, there is a force-adjusting set 240 for adjusting the initial torsion forces in the torsion spring set 230 which vary proportionally to the different body weights of the occupants sitting on this automatic safety car seat (see FIGS. 7–9). In the present invention, this force-adjusting set 240 is the same either used for adjusting the initial forces in the torsion or the tension springs.

The force-adjusting set 240 is composed of a steel rail 241 whose cross-section is of C-shape with its back mounted tightly and horizontally onto the steel plate 300. A slidable steel bar 242 is placed inside the rail 241 and can move freely and horizontally along the rail 241. At the posterior end on the outer surface of the slidable steel bar 242 is a closed-circular loop 243 to be engaged with the long loop 235 of the torsion spring set 230. FIG. 9A is a cross-sectional view of the slidable steel bar 242 along line 2—2 in FIG. 8 at the position where the closed-circular loop 243 is mounted tightly onto.

Near the anterior end of the slidable steel bar, there is a cursor 244 made of steel fixed onto the outer surface of the steel bar through its base 245 having the upper part 246 of the cursor 244 bent at an angle of about 110 degrees to bring its arrow head 247 close to the surface 301 of the steel plate 300 and to point to a number on a scale indicating the body weight of the occupant on the automatic safety seat. FIG. 9B shows a cross-sectional view of the slidable steel bar along line 3—3 in FIG. 8 at the position where the cursor 244 is fixed to.

The anterior end of the slidable steel bar 242 is extended out as a long steel rod 248 having the external threads. The long steel rod 248 lies horizontally and parallelly to the surface 301 of steel plate 300.

The long steel rod 248 inserts through a circular hole 249 of a small steel plate 250 which is mounted perpendicularly onto the surface 301 where the diameter of the circular hole 249 is just slightly greater than the diameter of the long steel rod 248.

The steel rod 248 is fixed tightly with the small steel plate 250 by two hexagonal head nuts 251 and 252 flanking both sides of the plate 250 where the external threads of the steel rod 248 mate tightly with the internal threads of the two nuts.

The slidable steel bar 242 together with the cursor 244 and the long steel rod 248 can move to and fro horizontally by adjusting the two nuts 251 and 252.

The nut 252 when turned tightly onto the steel plate 250 is at a distance of at least 5 centimeters anterior to the end 253 of the steel rail 241 as shown in FIG. 8 to allow turning of the nut 252 conveniently along the steel rod 248 when adjusting the torsion force within the torsion spring set or the tension force within the tension spring set where one end of the spring set is engaged to the closed-circular loop 243 of this force-adjusting set 240.

About 5 centimeters posterior to the end 253 of the steel rail 241, there is a vertical line of the scale 302 on the surface 301 of steel plate 300 representing the maximum body weight of the occupant to be seated on the safety car seat.

The arrow head 247 of the cursor 244 points to the scale 302 on surface 301. Scale 302 is a scale showing the different body weights of the occupants in kilograms.

The construction of this scale 302 is one of the most important part of the invention to be described in details later.

The force-adjusting set 240 is connected to the torsion spring set 230 by the closed-circular loop 243 engaged to the long loop 235 of spring set 230 as shown in FIGS. 2, 3, and 4. The curving end 306 of hook 304 is engaged to steel axle 220 of steel bar 214 at all time while collision has not yet occurred.

Even if there is no occupant reclines against the backrest 213, the curving end 306 of hook 304 is still engaged to the steel axle 220. In normal condition, the backrest 213 and the steel bar 214 recline slightly backward where the reclining angle is 70 degrees to the horizontal which generally is the normal reclining angle of the backrest of most car seats as shown in FIGS. 3 and 4.

Since the closed-circular loop 243 at the end of the slidable steel bar 242 of the force-adjusting set 240 is engaged to the long loop 235 of the torsion spring set 230; if the torsion force within the spring set 230 is to be increased due to the increasing occupant's body weight, the steel bar 242 must be adjusted to move forward along the direction of arrow head 254 in FIG. 8. This can be achieved by releasing the nut 252 to move to the direction of arrow 255 and screwing the nut 251 to move to the same direction to fit onto the anterior face of small steel plate 250. This draws the steel bar 242 to move along the direction of arrow 254 meanwhile the cursor 244 is also drawn to move to the same direction along the surface 301 of the steel plate 300. This action causes the closed-circular loop 243 to draw the long loop 235 to move along to the same direction, thus the torsion force within the torsion spring set 230 is increased. Vice versa, when the torsion force within the torsion spring set 230 is to be decreased, the closed-circular loop 243 is moved to the direction of the arrow 255.

A steel plate 320 is mounted up perpendicularly to the surface 301 of the steel plate 300 as shown in FIGS. 2, 3, and 4; and has a braking compression spring 321 fixed tightly onto its lateral surface to the anterior of the vehicle. This high stiffness braking spring 321, positions at least 10 centimeters lower than the cylindrical steel shaft 221. It functions as the absorber of the impact force occured during a severe frontal collision and braking the steel bar 214 by allowing the pressing of the lowest part 260 of the steel bar 214 onto this spring 321 when the collision velocity is above 40 Km/h.

In the present invention, a severe collision means a collision of a vehicle occurs at a relative velocity of 40 Km/h or up which would cause serious injuries to the occupants had the presently described automatic safety car seats not been used.

Coil 322 is the outermost spring coil of the spring set 321. The spring set 321 is to absorb the impact and to limit the inclination angle of the steel bar 214 thrusting pivotally towards the anterior of the car together with the occupant fastened by the safety-belts 216 and 218 at the time the collision occurs at a collision velocity of over 40 Km/h. The lowest part 260 of the steel bar 214 is to be pressed onto this spring 321. In a normal situation while no collision occurs, the lowest part 260 is located anterior to and at an appropriate distance away from the spring 321.

On steel plate 300 to the rear of steel plate 320, there is a force-absorbing spring set 330. A small thick steel block 331 is fixed tightly and perpendicularly to the surface 301 of the steel plate 300 having internal threads. The internal threads mates tightly with external threads of a thick steel rod 332 to fit the steel rod 332 in a vertical position. At the upper end 333 of the steel rod 332 there is a compression spring 334 which fixed tightly onto the top. This spring 334 is to absorb the impact force which occurs at the time the steel bar 214 together with the backrest 213 and the fastened occupant are drawn backward by the torsion spring set 230 when collision occurs at 40 Km/h and up.

On the steel plate 300, downward right below the steel rod 332 there is a scale 336 showing the degrees of reclining angles at which steel bar 214 may make to the horizontal after being drawn backward by the torsion spring set 230 to press onto the compression spring 334. A reclining angle can be set by adjusting the steel rod 332 up or down to have the lowest end of the steel rod 332 as a pointer points to the degree of the reclining angle on the scale 336.

Figure 33:
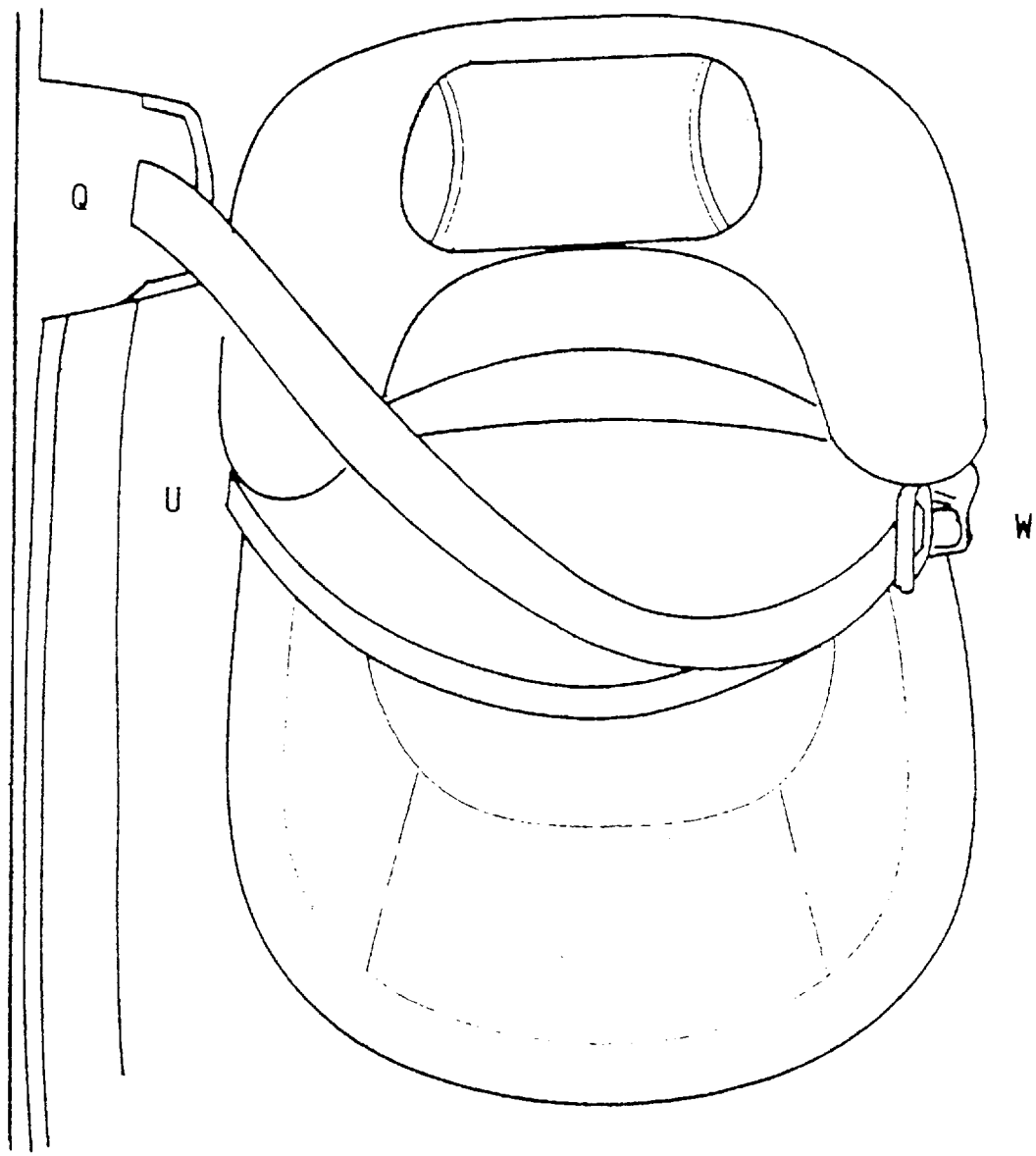
FIG. 33 shows the conventional presently available seats and seat-belts in the car (Prior Art).

This automatic safety seat in the vehicle is used as follows: the occupant 400 sits on the safety seat 211 and fastens himself to the seat against the backrest 213 by two safety-belts 216 and 218 using the strap locks 219. Notably, these two safety-belts are fastened to the two steel bars 214 on both sides of the backrest 213. This is a distinct difference than the conventional seat-belt system of which the three-point attachment is used, i.e. one to the upper part of the pillar at the middle of the chassis—at position Q and the other two points on the floor—at positions U and W which is the prior art as shown in FIG. 33 such that there is no point attached to the backrest 213 at all. For those conventional designs, when a serious collision occurs, the front seat occupants, both the driver and the front seat passenger would always strike the deformed intruding steering wheel together with the deformed dashboard while the backseat passengers would be compressed by the collapsed backrest of the front seats. These all can cause most of the time very serious injuries to the occupants as severe as brain damages, chest injuries and even fatal consequences.

For the automatic safety car seat 211 of the presently described invention, the chest 401 and the pelvis 402 of occupant 400 are fastened to the backrest 213 by safety-belts 216 and 218 especially designed to be used with the automatic safety car seat 211.

All the components of the automatic safety car seat 211 start to function right the moment the collision takes place at a velocity of 40 Km/h or up. The backrest 213 suddenly reclines backward and thus draw together the upper part of the occupant's body from pelvis up to head reclining at the same moment.

To use the automatic safety car seat 211, all the mechanisms must be first adjusted according to the body weight of the occupant seated as follow:

Step 1

Figure 10:
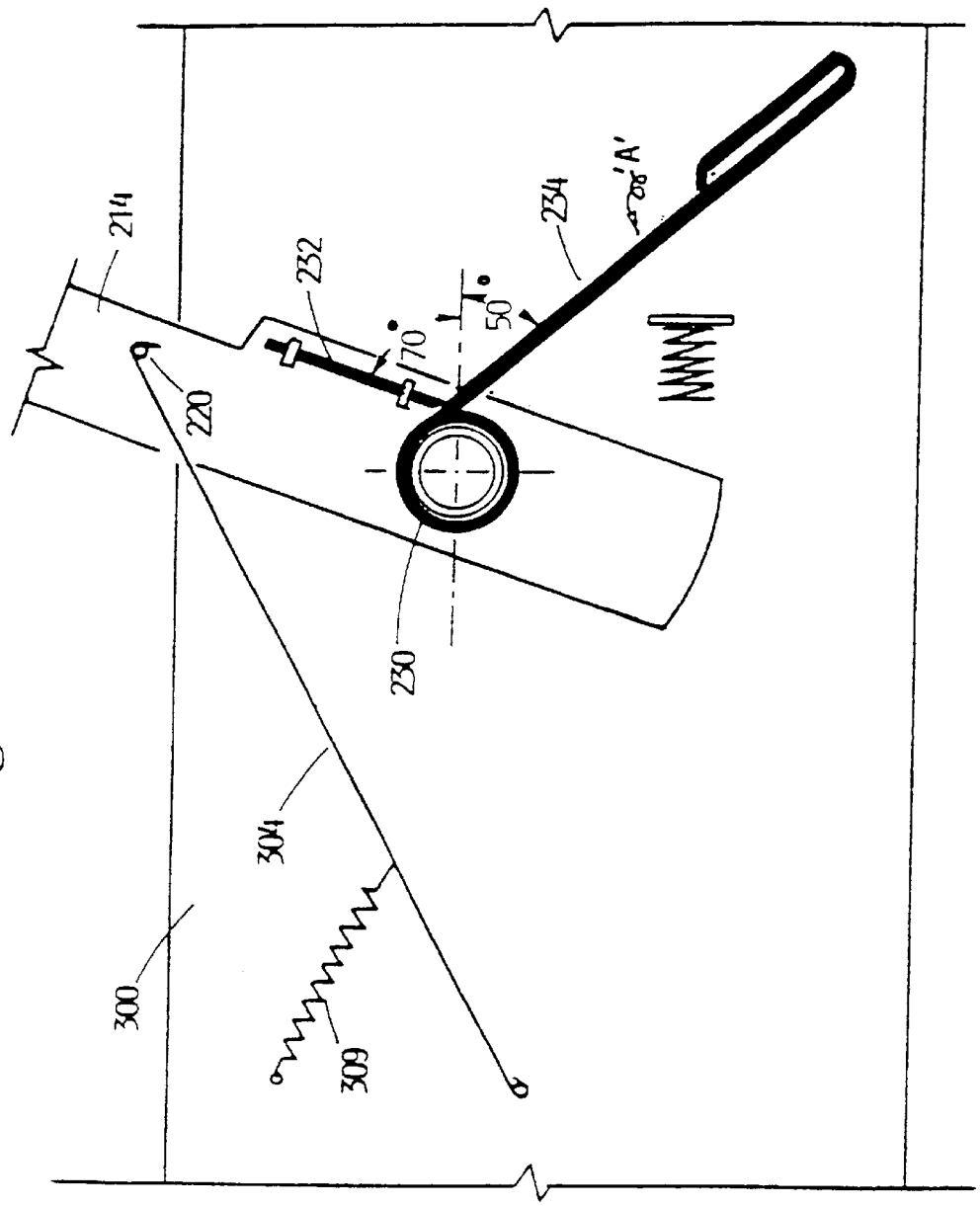
FIG. 10 shows a torsion spring set in a normal or free position where there is no external force exerted upon.

The arm 234 is at a normal or resting position at 'A' which is the position where there is no external force exerts on the torsion spring set 230. Thus, the torsion force within the torsion spring is zero. The long loop 235 has not yet been drawn by the closed-circular loop 243 of the force-adjusting set 240 as shown in FIG. 10. At this position 'A', the arm 234 makes an angle of 50 degree to the horizontal.

Step 2

Figure 11:
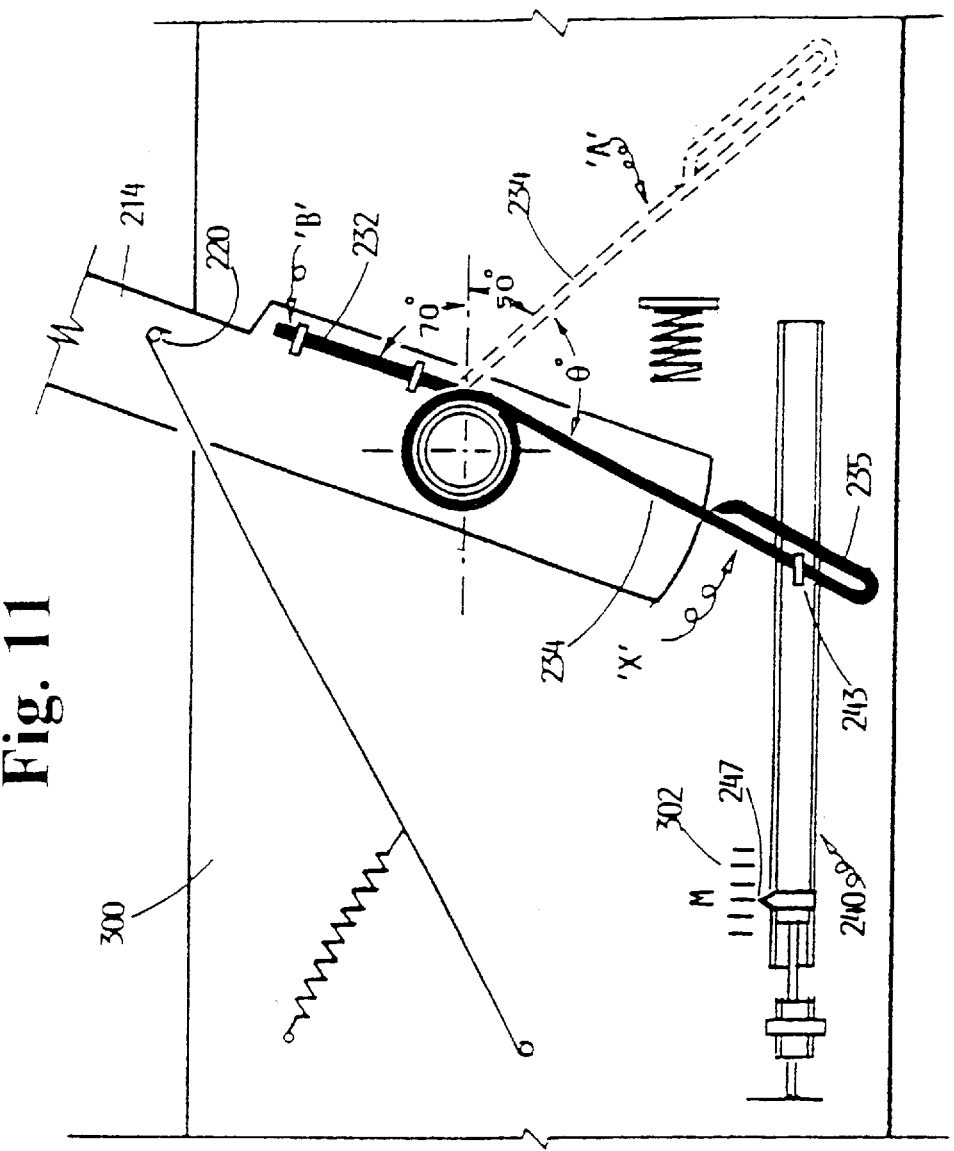
FIG. 11 shows the adjusting of the initial torsion force within the torsion spring set according to the body weight of the occupant on the automatic safety seat.

When a person of the body weight of M Kg. is going to sit on this automatic safety car seat, all the mechanisms of the seat must be first adjusted. As shown in FIG. 11, the closed-circular loop 243 of the slidable steel bar 242 of the force-adjusting set 240 is adjusted to draw the long loop 235 of arm 234 away from position 'A' in FIG. 10 until the arrow head 247 points at the figure indicating the body weight 'M' Kg. of the occupant on the scale 302. The arm 234 is thus drawn to the position 'X' making an angle of θ to the original position 'A'. At this position, the whole set of active coils of the spring set is also twisted θ degrees. This gives a predetermined distance along the circumference of the spring coil that the spring set is twisted of, assumingly, $x_1$ meters. An initial torsion force thus is created in each torsion spring set 230 of F newtons, or $Kx_1$ newtons, when K is the 'stiffness', newtons per meter, of the torsion spring set 230.

This initial torsion force, F, is the force to fix the hook 304 in place engaged to the steel axle 220 of the steel bar 214 and thus fixes the backrest 213 tightly in place.

This initial torsion force, F newtons, or F/9.81 Kg. is the force within the torsion spring set 230 to impose stress on the arm 232 when it is in the position 'B', (at this position 'B', the arm 232 makes an angle of 70 degrees to the horizontal as shown in FIG. 11), which is fixed tightly to the steel bar 214 with the two clamps 233 such that the torsion spring set 230 tries to push the backrest 213 backward at all time. However, since the steel bar 214 is held in place by engaging of the hook 304 at the steel axle 220, therefore it is fixed tightly with this enormous force, F, in place at all time. The calculations below show that this initial torsion force, F, is great enough to hold the steel bar 214 in place and it is not possible that the movement of the occupant fastened by the seat-belts to the backrest 213 may unintentionally cause the release of the hook 304 from engaging to the steel axle 220. This can prevent the occupant not to be drawn to recline backward by chance while he is sitting on this safety seat in a moving vehicle in a situation when collision has not yet occurred. This is possible because the initial force within the torsion spring can be set to a predetermined value so great to make hook 304 engaged tightly on the steel axle 220 that an occupant, while in a sitting position fastened to the backrest by the seat-belts, can never release hook 304 by simply leaning himself forward. As shown in the calculations, the occupant having a body weight of 60 Kg. must adjust the torsion spring sets 230 on both side of the backrest to have a total predetermined initial torsion force of 3,386.56 Kg. which is far greater than 60 Kg. Thus, the backrest can never be unintentionally drawn forward to cause the release of the hook 304 from engaging to the steel axle 220.

TABLE 1

| M Kilograms | $x_1$ Meters | θ Degrees | M Kilograms | $x_1$ Meters | θ Degrees | M Kilograms | $x_1$ Meters | θ Degrees |
|---|---|---|---|---|---|---|---|---|
| 30 | 0.002499 | 2.045 | 60 | 0.034998 | 28.646 | 90 | 0.067497 | 55.246 |
| 32 | 0.004666 | 3.819 | 62 | 0.037165 | 30.419 | 92 | 0.069664 | 57.020 |
| 34 | 0.006832 | 5.592 | 64 | 0.039331 | 32.193 | 94 | 0.071830 | 58.793 |
| 36 | 0.008999 | 7.366 | 66 | 0.041498 | 33.966 | 96 | 0.073997 | 60.566 |
| 38 | 0.011165 | 9.139 | 68 | 0.043664 | 35.739 | 98 | 0.076163 | 62.340 |
| 40 | 0.013332 | 10.912 | 70 | 0.045831 | 37.513 | 100 | 0.078330 | 64.113 |
| 42 | 0.015499 | 12.686 | 72 | 0.047998 | 39.286 | 102 | 0.080497 | 65.886 |
| 44 | 0.017665 | 14.459 | 74 | 0.050164 | 41.059 | 104 | 0.082663 | 67.660 |
| 46 | 0.019832 | 16.232 | 76 | 0.052331 | 42.833 | 106 | 0.084830 | 69.433 |
| 48 | 0.021998 | 18.006 | 78 | 0.054497 | 44.606 | 108 | 0.086996 | 71.207 |
| 50 | 0.024165 | 19.779 | 80 | 0.056664 | 46.379 | 110 | 0.089163 | 72.980 |
| 52 | 0.026332 | 21.552 | 82 | 0.058831 | 48.153 | 112 | 0.091330 | 74.753 |
| 54 | 0.028498 | 23.326 | 84 | 0.060997 | 49.926 | 114 | 0.093496 | 76.527 |
| 56 | 0.030665 | 25.099 | 86 | 0.063164 | 51.700 | 116 | 0.095663 | 78.300 |
| 58 | 0.032831 | 26.873 | 88 | 0.065330 | 53.473 | 118 | 0.097829 | 80.073 |
|  |  |  |  |  |  | 120 | 0.10000 | 81.85 |

By the time the arm 234 moves from postion 'A' to position 'X', the arm 232 and the steel bar 214 are fixed in place by the hook 304 which is engaged tightly to the steel axle 220 at all time as in FIG. 11.

The angle θ is the angle that the force-adjusting set 240 draws the arm 234 away from the normal or resting position 'A' to a new position 'X'. It is important to know this value, θ, to adjust the arm 234 to move to a new position corresponding to the body weight, M, of the occupant. This value, θ, varies proportionally to the body weight and can be obtained by engineering mechanics calculation to be shown later.

Figure 12:
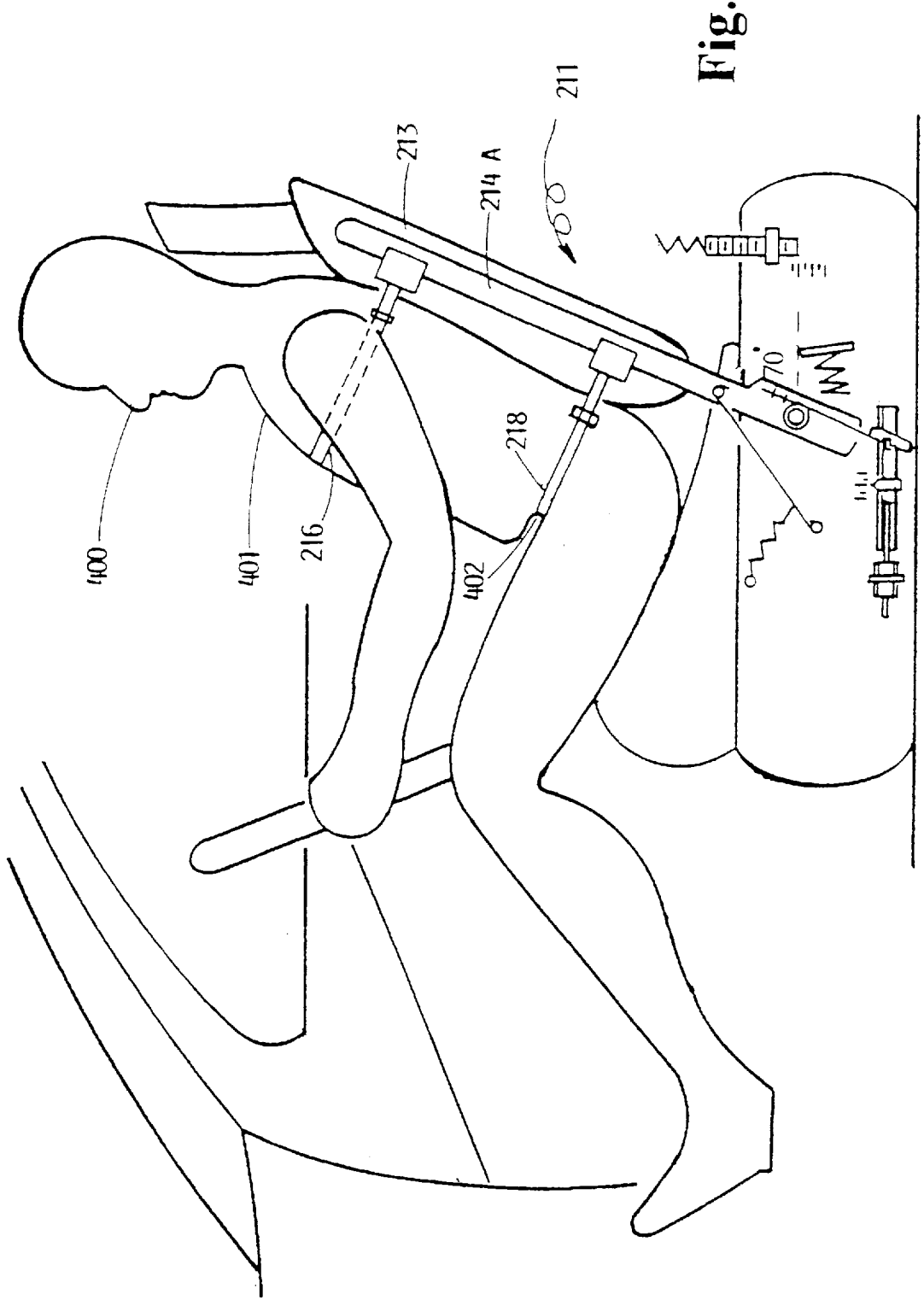
FIG. 12 shows the occupant, sitting on the automatic safety car seat of the torsion spring type for the front compartment of the car, while the car is moving at any velocity and the collision has not yet occurred.

After all the mechanisms of the automatic safety seat 211 are adjusted, the occupant 400 of body weight, M, sits on the seat 211 and fastens himself to the backrest by the safety-belts 216 and 218 and the car is moving steadily at a certain speed as shown in FIG. 12.

Figure 13:
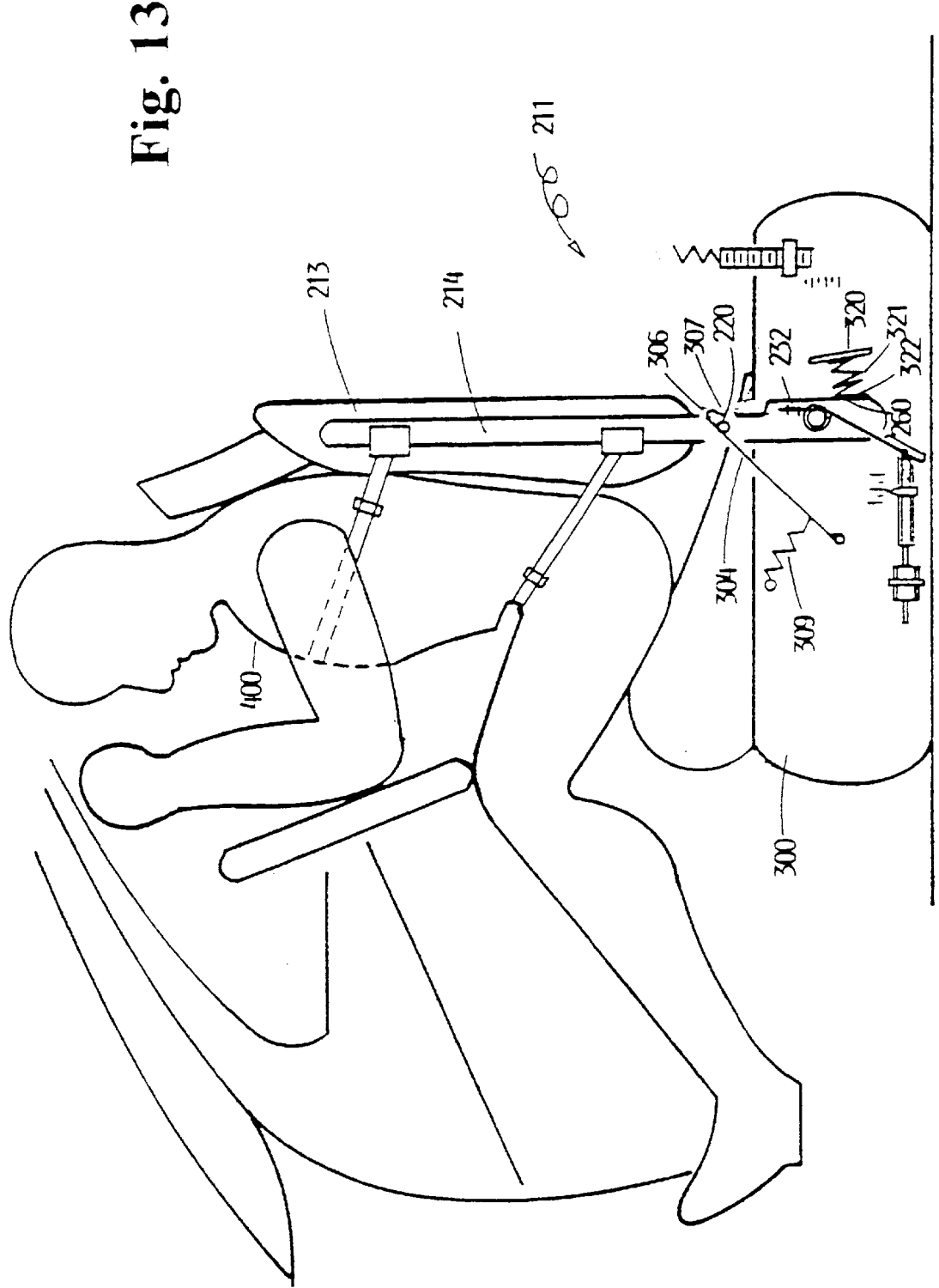
FIG. 13 shows the occupant, sitting on the automatic safety car seat of the torsion spring type for the front compartment of the car, when the collision velocity is 40 Km/h.

When the collision velocity is 40 Km/h (11.11 m/sec),

FIG. 13 shows the occupant 400 and the automatic safety seat 211 at the moment of collision.

Figure 14:
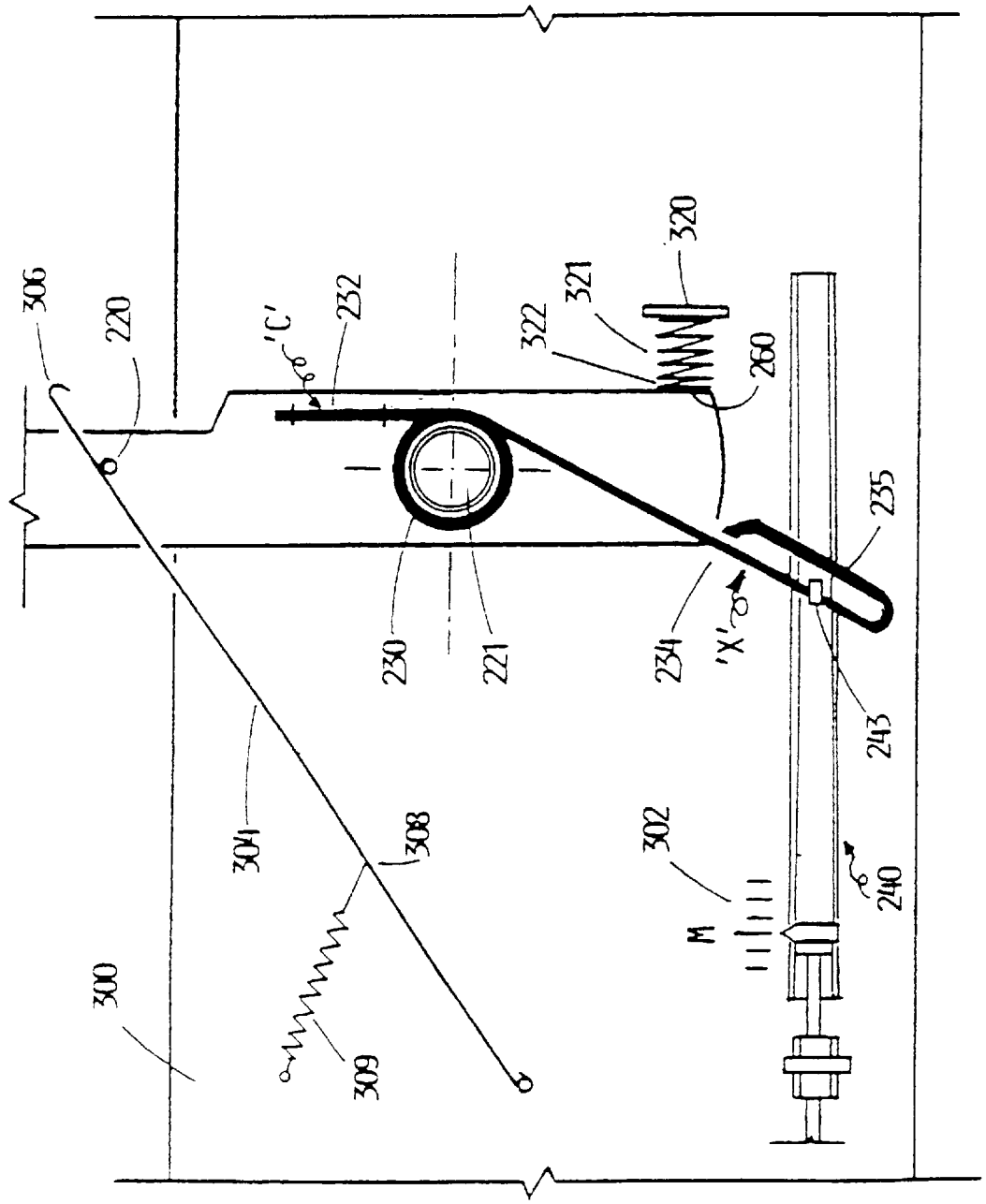
FIG. 14 shows the positions of the mechanisms of the automatic safety car seat of the torsion spring type when the collision velocity is 40 Km/h.

All the mechanisms of the safety seat 211 function as follow:

1. The car is abruptly stopped, but the occupant thrusts forwards with an initial velocity of 40 Km/h. This situation causes the automatic seat-belt tensioner systems 212 to pull the seat-belts tight. The kinetic energy of a moving occupant is converted into the impact energy. The occupant 400 together with the backrest 213 and the steel bars 214 thrust forward having the steel shaft 221 as the center for pivoting movement until stopped for a moment due to the deceleration by the spring set 230 when the arm 232 is at the position 'C' (FIG. 14). At this position, the spring set 230 is twisted further for another predetermined distance of, assumingly, 0.06 meters along the circumference of the spring set from the previous position 'B' of the arm 232. Thus, the distance along the circumference that the spring set 230 is twisted from the original position 'A' is equal to $x_1+0.06$ meters. Let $x_2=x_1+0.06$.

2. As the steel bar 214 thrusts pivotally forward, the steel axle 220 then pushes the hook 304 to raise the curving end 306 up until the tipping end 307 is released from the steel axle 220. This causes the tension spring 309 to pull the hook 304 up and away thus disengages the hook 304 from the steel axle 220. Meanwhile, the occupant together with the steel bar 214 move further forward until they are decelerated to stop for a while ($V_2$ of the occupant=0) when the arm 232 reaches the position 'C' by the torsion force in the torsion spring set 230 as in FIG. 14.

At the same moment, the lowest part 260 of the steel bar 214 touches the outmost spring coil 322 of the compression spring set 321 but the compression, however, has not yet occurred. The torsion force within the torsion spring set 230, when the arm 232 is at the position 'C', is thus=$K(x_1+0.06)$ newtons.

Figure 17:
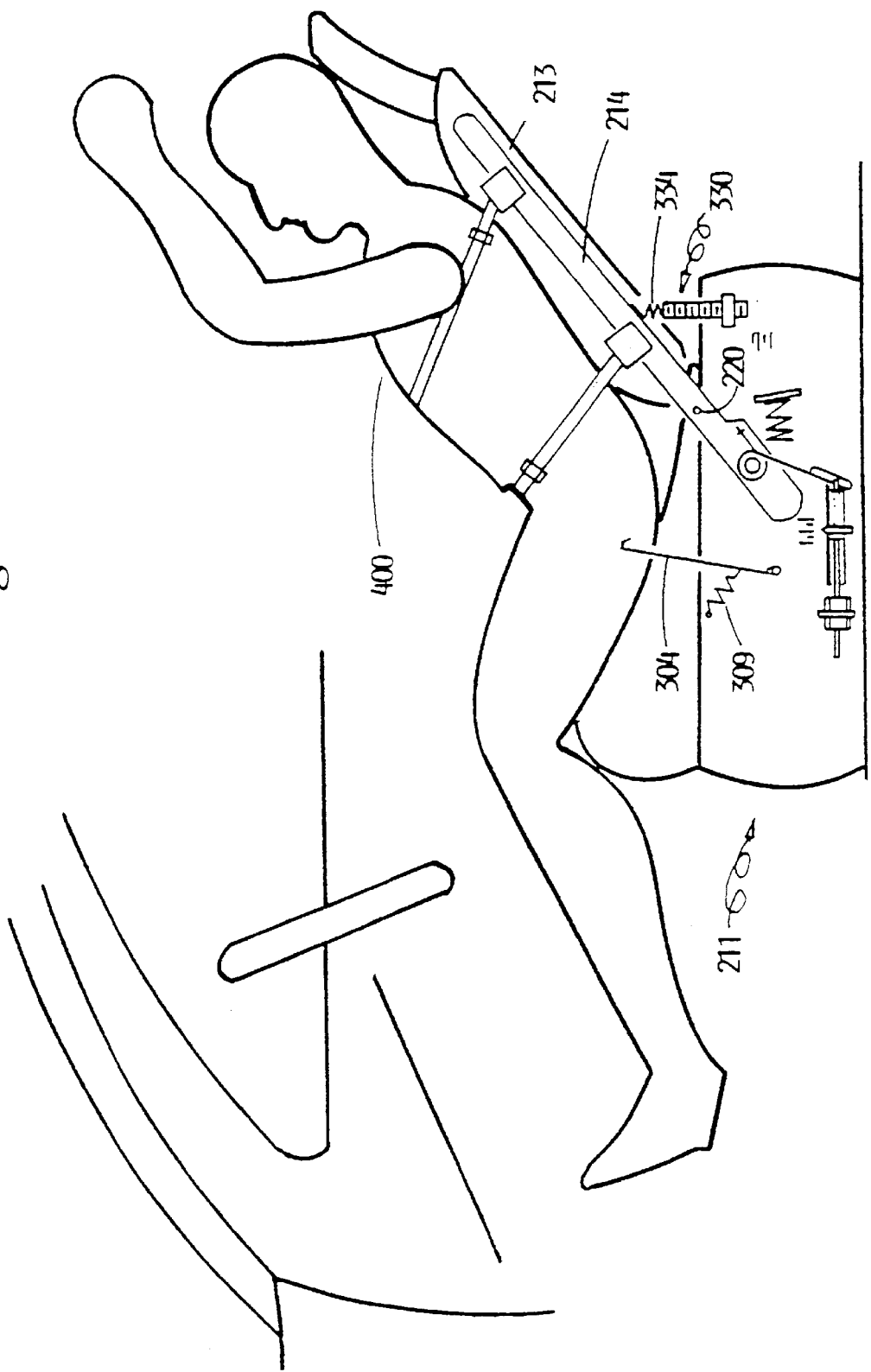
FIG. 17 shows the backrest of the automatic safety car seat of the torsion spring type together with the occupant which have been pushed to recline backward after the collision occurred at 40 Km/h or up.

This torsion force pushes the steel bar 214 and the backrest 213 together with the occupant 400 to recline backward until the steel bar 214 compresses on the compression spring 334 which functions as the absorber, as shown in FIG. 17.

3. FIG. 17 shows that from pelvis up to head of the occupant is pulled away from the intruding deformed front compartment and steering wheel, thus brain damage and chest injuries could be avoided.

Figure 16:
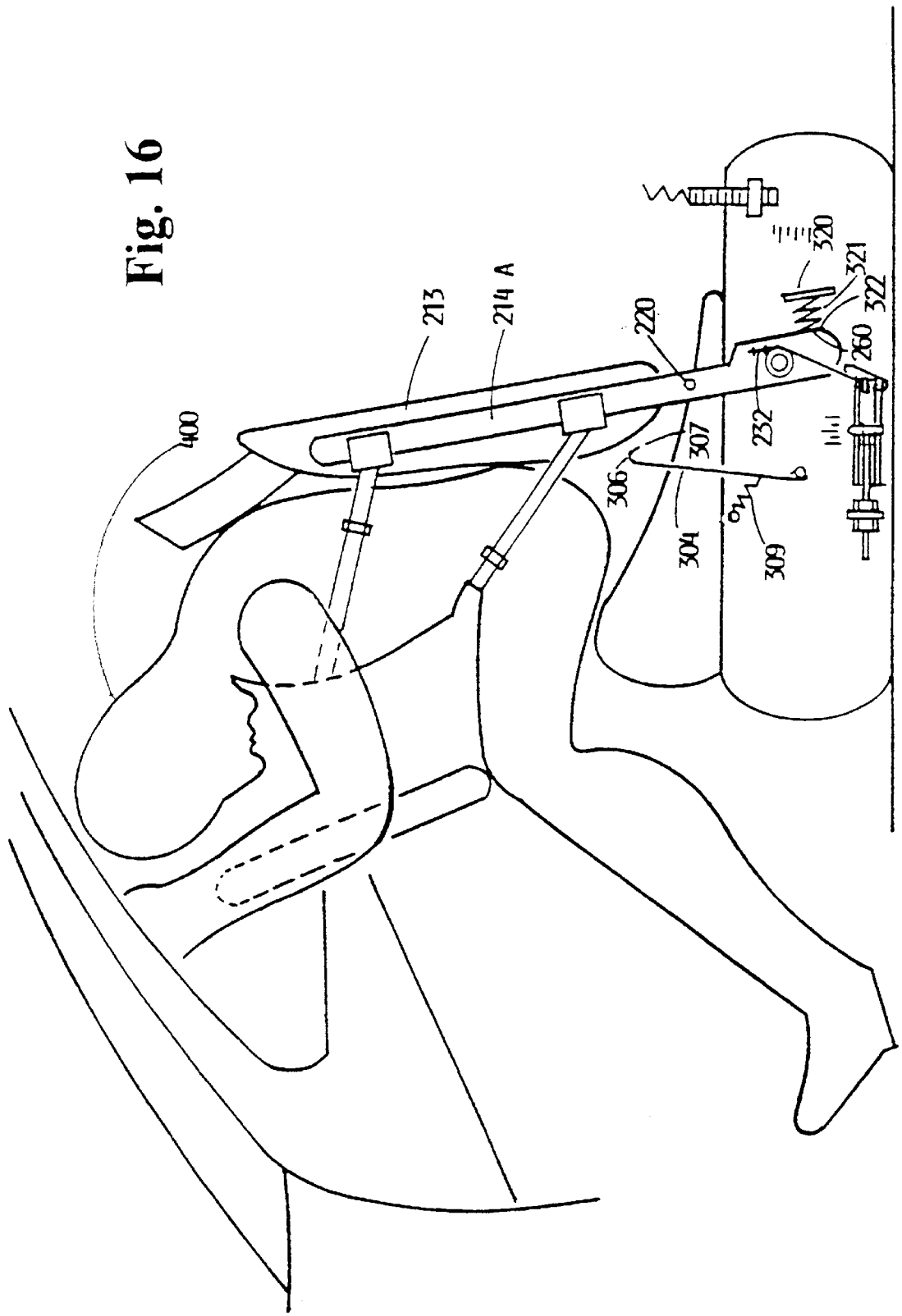
FIG. 16 shows the automatic safety car seat of the front compartment of the torsion spring type together with the occupant, when the collision velocity is over 40 Km/h.

When the collision velocity is over 40 Km/h (11.11 m/sec),

FIG. 16 shows how all the mechanisms of the automatic safety seat 211 function as follow:

1. No matter how great an impact energy from the collision is, the steel bar 214 will thrust forward, assumingly, not more than 130 degrees to the horizontal.

2. This is achieved since the lowest part 260 of the steel bar 214 compresses the compression spring 321 mounted laterally on the steel plate 320 tightly to the farmost, of which the position of the steel plate 320 is preset to allow that the inclination of the steel bar 214 forward can never be greater than 130 degrees to avoid the striking of the occupant's body to the steering wheel or the dashboard or any other components of the front compartment. For the back seat passengers, striking with the collapsing backrest of the front seat can then be similarly avoided.

3. Spring 309 draws the hook 304 up and disengaged from hooking to the steel axle 220 as that of in previous case.

4. The torsion force within the spring coils of the torsion spring set 230 thus twists the arm 232 backward (while the arm 234 is fixed in place by the force adjusting spring set 240) and pushes the steel bar 214, the backrest 213 and the occupant 400 altogether backward as in FIG. 17, avoiding the brain damage and the chest injuries in the same manner as in the previous case.

Calculations

1. The stiffness of the spring which is a constant for each spring set must be calculated.

2. The distance $x_1$ and the angle $\theta$ that the arm 234 must be drawn from a normal resting position 'A', which is the position of the arm 234 where there is no external force exerted upon, to a new position must be calculated.

The distance $x_1$ and the angle $\theta$ vary proportionally to the body weight, M of the occupant 400 who sits on this automatic safety seat 211. When $x_1$ is known, then the initial force, F can be calculated, where $F=Kx_1$ which is the initial torsion force within each torsion spring set on each side of the safety seat. Therefore, the total force that held the backrest tightly in place is equal to 2F, while the collision has not yet occurred.

3. The maximum value of $x_1$ for maximum M must not be too great or the scale 302 will be too long to fit onto the steel plate 300.

4. A scale 302 is constructed using the calculated values of $\theta$ where the arm 234 moves to a different position depends on the varying body weight, M, of the occupant 400 who sits on the safety seat 211.

This scale 302 is essential for the functioning of the automatic safety car seat and the known values of $\theta$ must be used for drawing a practical scale.

Figure 15:
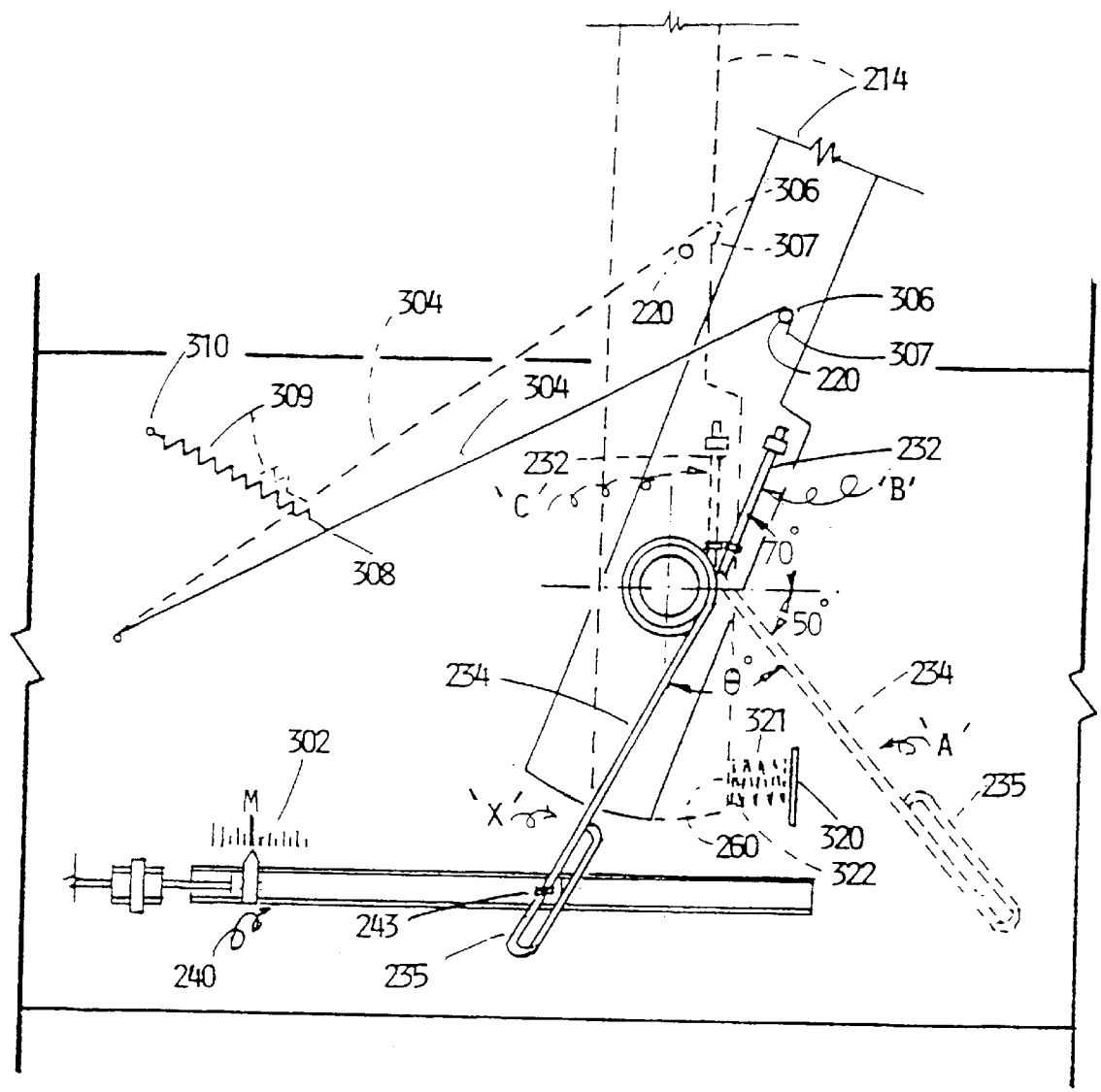
FIG. 15 is a combination of FIGS. 11 and 14 to be referred for calculations.

FIG. 15 which is redrawn from FIGS. 11 and 14, shows the enlarged picture of the components of the safety seat without the occupant and the backrest. At position 'A', the arm 234 is in the normal resting position where there is not yet any external force exerted upon the torsion spring set 230, i.e. the torsion force within the spring set 230 is equal to zero. The long loop 235 has not yet been drawn by the closed-circular loop 243 of the force-adjusting set 240. At this position 'A', the arm 234 makes an angle of 50 degrees to the horizontal.

The values can be calculated, where

M is the body weight in kilograms, Kg. of the occupant, m is half of the occupant's body weight which exerts equally on each of the steel bars 214A and 214B, thus, m=M/2

$V_1$ is the initial velocity of the occupant 400 when the collision occurs at the velocity 40 Km/h, thus, $V_1$=40 Km/h, or =11.11 m/sec which is equal to the velocity of the car when the collision occurs, $V_2$ is the final velocity of the occupant 400 which is decelerated and held still by the torsion spring set 230 at position C with an angle of 90 degree to the horizontal as shown in FIG. 14, i.e., $V_2$=0, and $\theta$ is the angle that the arm 234 moves from the position 'A' to a new position 'X', thus the torsion spring is twisted for a distance of $x_1$, along its circumference $x_1$ is the linear distance in meters along the circumference of the spring set when the arm 234 moves from position 'A' to position 'X' and makes an angle of $\theta$ degree, and $x_2=x_1+0.06$ meters K is the stiffness, newtons per meter, of the torsion spring set 230.

This is a constant value for each torsion spring set.

The work-energy equation for a moving particle states that the total work done by all forces acting on a particle during an interval of its motion from condition 1 to condition 2 equals the corresponding change in kinetic energy of the particle, thus $$-\tfrac{1}{2}K(x_2^2 - x_1^2) = \tfrac{1}{2}m(V_2^2 - V_1^2)$$

substitute all the values in Equation above, $$\therefore -\tfrac{1}{2}K\{(x_1+0.06)^2 - x_1^2\} = \tfrac{1}{2}(M/2)(0^2 - 11.11^2)$$

$$-\tfrac{1}{2}K(0.12x_1 + 0.0036) = -30.858M$$

$$\therefore \tfrac{1}{2}K(0.12\ x_1 + 0.0036) = 30.858M \tag{1}$$

Assuming the maximum body weight, M, of the occupant=120 Kg. when maximum $x_1$ is predetermined to=0.1 meter.

∴From Equation (1)

$$\tfrac{1}{2}K(0.12 \times 0.10 + 0.0036) = 30.858 \times 120$$

$$\therefore\ K\ =\ 474{,}738.46\ \text{newtons/meter}$$
$$=\ 474{,}738.46/9.81\ \text{Kg./meter}$$
$$=\ 48{,}393.32\ \text{Kg./meter}$$

Substitute K=474,738.46 newtons/meter in Eq. (1)

$$\tfrac{1}{2} \times 474{,}738.46(0.12\ x_1 + 0.0036) = 30.858M\ x_1 = 0.0010833M - 0.03 \tag{2}$$

Let diameter of the spring coil is predetermined and=0.14 meter,

∴The circumference=0.14 ¶ meter.

That is the length 0.14 ¶ meter is equal to the angle 360 degrees thus, the distance along the circumference=$x_1$ meter is equal to $$360\ x_1/0.14\ \P = 818.5\ x_1\ \text{degrees let}\ \theta = 818.5\ x_1 \tag{3}$$

Substitute $x_1 = 0.0010833M - 0.03 \therefore \theta = 818.5(0.0010833M - 0.03) \tag{4}$ From Eq. (2) and (4) when M is known, $x_1$, θ and 2F can be calculated, for example, M=30 Kg. then $x_1$=0.00245 meters, θ=2.045 degrees $$2F\ =\ 2 \times 48{,}393.32 \times 0.00245\ \text{Kg.}$$
$$=\ 237.12\ \text{Kg.}$$

M=60 Kg., $x_1$=0.03499 meter, θ=28.65 degrees $$2F\ =\ 2 \times 48{,}393.32 \times 0.03499\ \text{Kg.}$$
$$=\ 3{,}386.56\ \text{Kg.}$$

Thus, the value 2F is great enough to hold the hook 304 engaged tightly to the axle 220 of the steel bar 214 that the backrest and the occupant will never be unintentionally pulled to recline backward in the situation when the collision has not yet occurred.

If the collision occurs at a velocity over 40 Km./h, the steel bar 214 is pivoting forward assumingly not more than 130 degrees to the horizontal since the lowest part 260 of the steel bar presses fully against the spring 321 as shown in FIG. 16.

Thus, the angle that the arm 232 moves further from the previous position at 'B' is equal to 130−70=60 degrees.

The distance that the spring is stretched out along the circumference of the spring coil=60×0.14 ¶/360=0.073304 meter This distance is longer than 0.06 meter which is the distance the spring stretches out along the circumference when collision occurs at 40 Km/h.

The values of $x_1$ and θ are shown in the Table 1, corresponding to the occupant's body weight, M of 30, 32, 34, 36, . . . or 120 Kg.

Constructing of Scale 302 of the Automatic Safety Car Seat using Torsion Spring Sets Before constructing the scale 302 for adjusting the initial torsion force within the torsion spring set 230, the values of θ which varies with respect to the body weight, M, of the occupant on the car seat must be first calculated from the Equation (4)

θ=818.5 (0.0010833M−0.03) degrees

From Table 1, when M=30, 40, 50, 60, 70, 80, 90, 100, 110 and 120 Kg. then θ=2.04, 10.91, 19.78, 28.65, 39.54, 46.37, 55.24, 64.11, 72.98 and 81.85 degrees, respectively.

After the values $\theta_1$ are obtained as shown in Table 1, from FIG. 18 the following steps can be performed:

1. during the construction of scale 302, the curving end 306 of the hook 304 must engage at all the time to the steel axle 220 of the steel bar 214 which fixed the steel bar 214 and the arm 232 in place also at all time.

2. Assuming the occupant, sitting on the automatic safety seat 211, has the body weight of 30, 40, 50, 60, 70, 80, 90, 100, 110 or 120 Kg. The arm 234 then makes the angle of 2.04, 10.91, 19.78, 28.65, 39.54, 46.37, 55.24, 64.11, 72.98 or 81.85 degrees to the normal position at 'A'.

3. From Table 1, when the occupant has a body weight of 30 Kg. then, the force-adjusting set must be adjusted such that the circular loop 243 of the slidable steel bar 242 draws the long loop 235 of the arm 234 from a normal resting position at 'A' along the arrow 254 to a new position '$A_1$' which makes an angle 2.04 degrees to position 'A', and the arrow head 247 points to a position on the surface 301 of the steel plate 300. Draw a vertical line on this position and label the number '30'.

4. When M is 40, 50, 60, 70, 80, 90, 100, 110 or 120 Kg., θ is then 10.91, 19.78, 28.65, 39.54, 46.37, 55.24, 64.11, 72.98 or 81.85 degrees, respectively. In the same way, the long loop 235 of the arm 234 is adjusted to the positions $A_2$, $A_3$, $A_4$, $A_5$, $A_6$, $A_7$, $A_8$, $A_9$ and $A_{10}$, respectively. Thus, the arrow head 247 is moved to different positions on the surface 301. Mark the vertical lines on these positions pointed by the arrow head 247 on the surface 301 of the steel plate 300 and label with the numbers 40, 50, 60, 70, 80, 90, 100, 110 or 120, respectively.

Thus, the vertical lines marked with the numbers 30, 40, 50, 60, 70, 80, 90, 100, 110 and 120 indicate the different body weights of each occupant to be seated on the automatic safety seat 211 such that each time before sitting on the seat 211, the occupant must first adjust the force-adjusting set to draw the arm 234 until the cursor points to the line correspond to his body weight.

5. The scale 302 constructed is drawn on each steel plate 300 on each side of the automatic safety seat 211. Before sitting on this seat, the occupant must adjust both force-adjusting sets each to the correct positions.

6. The scale 302 in FIG. 18 shows the vertical lines representing the body weights of the occupant of 30, 40, 50, 60, 70, 80, 90, 100, 110 and 120 Kg, respectively. Before sitting on the automatic safety car seat of the present invention, thus the occupant must first adjust the force-adjusting set to draw the straight arm 234 of the torsion spring to move until the arrow head 247 points to the vertical line corresponds to his body weight.

There is one of scale 302 on each surface 301 of each steel plate 300 on each side of the safety seat.

Figure 19:
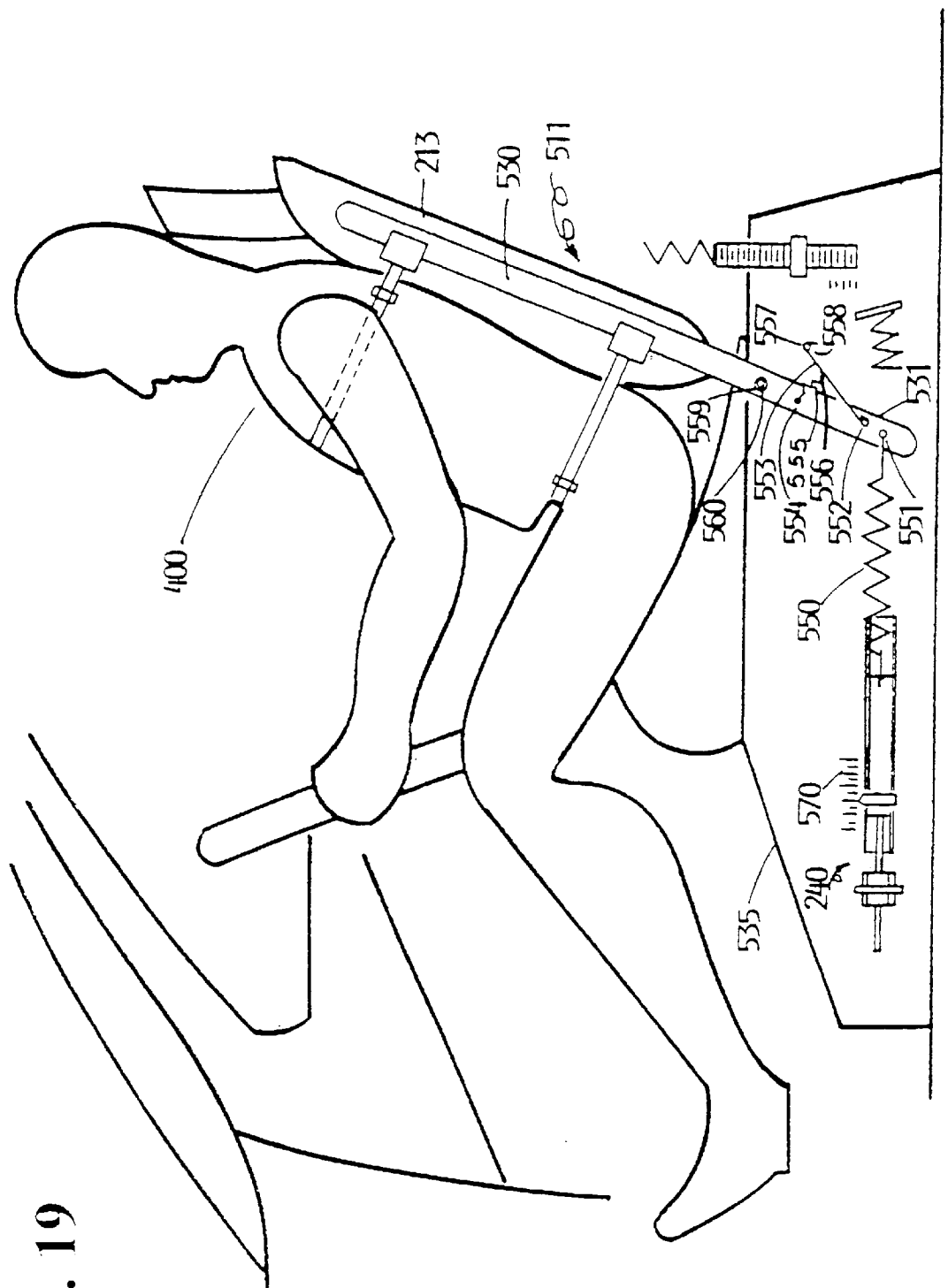
FIG. 19 shows the occupant, sitting on the automatic safety car seat of the tension spring type for the front compartment of the car, while the car is moving at any velocity and the collision has not yet occurred.

An Automatic Safety Car Seats for Occupants in the Front Compartment of the Car using the Tension Spring This type of automatic safety car seat 511 has all the components and the materials used similar to that of the one using the torsion spring type, except for:

as shown in FIG. 19, the spring used in this type of automatic safety car seat is a tension spring set 550. One end of this spring set is engaged to the closed circular loop 243 of the force-adjusting set, while the other end is fixed tightly round the steel axle 551 at the lowest end of the steel bar 530. Slight above the axle 551 is another axle 552 where the lower end of a hook 553 winds around and turns pivotally about this axle 552. Above the axle 552 is another steel axle 554 to which having one end of a tension spring 555 engaged on. The other end of the spring 555 is connected to the middle of the hook 553 at the position 556. The curving end 557 of the hook 553 engages onto the axle 558 on the steel plate 535.

On the steel bar 530 just above axle 554, there is a round hole 559 through which a cylindrical steel shaft 560 of the steel plate 535 pivotally fits in. The steel bar 530 can turn pivotally around this steel shaft 560 which acts as the axis of rotation.

All the other components of this automatic safety seat using the tension spring are the same as that of the one using the torsion spring and thus are given the same numbers.

In FIG. 19, which is in a normal condition where collision has not yet occured, the occupant 400, sitting on this automatic safety car seat 511, has been fastened properly with the presently designed safety-belts. The car is moving and collision has not yet occurred. The force-adjusting set 240 is adjusted to give a proper initial tension force within the tension spring 550. This causes increase in the length of the tension spring 550 from the original position where there is not yet any external force exerted upon. Assuming the length of the spring 550 increases $x_1$ meters from the original condition to create an initial tension force of F newtons within the tension spring 550. The arrow head 247 points then at the position M Kg. on the scale 570. This weight M Kg. is the body weight of the occupant 400 sitting on the automatic safety car seat 511.

Figure 20:
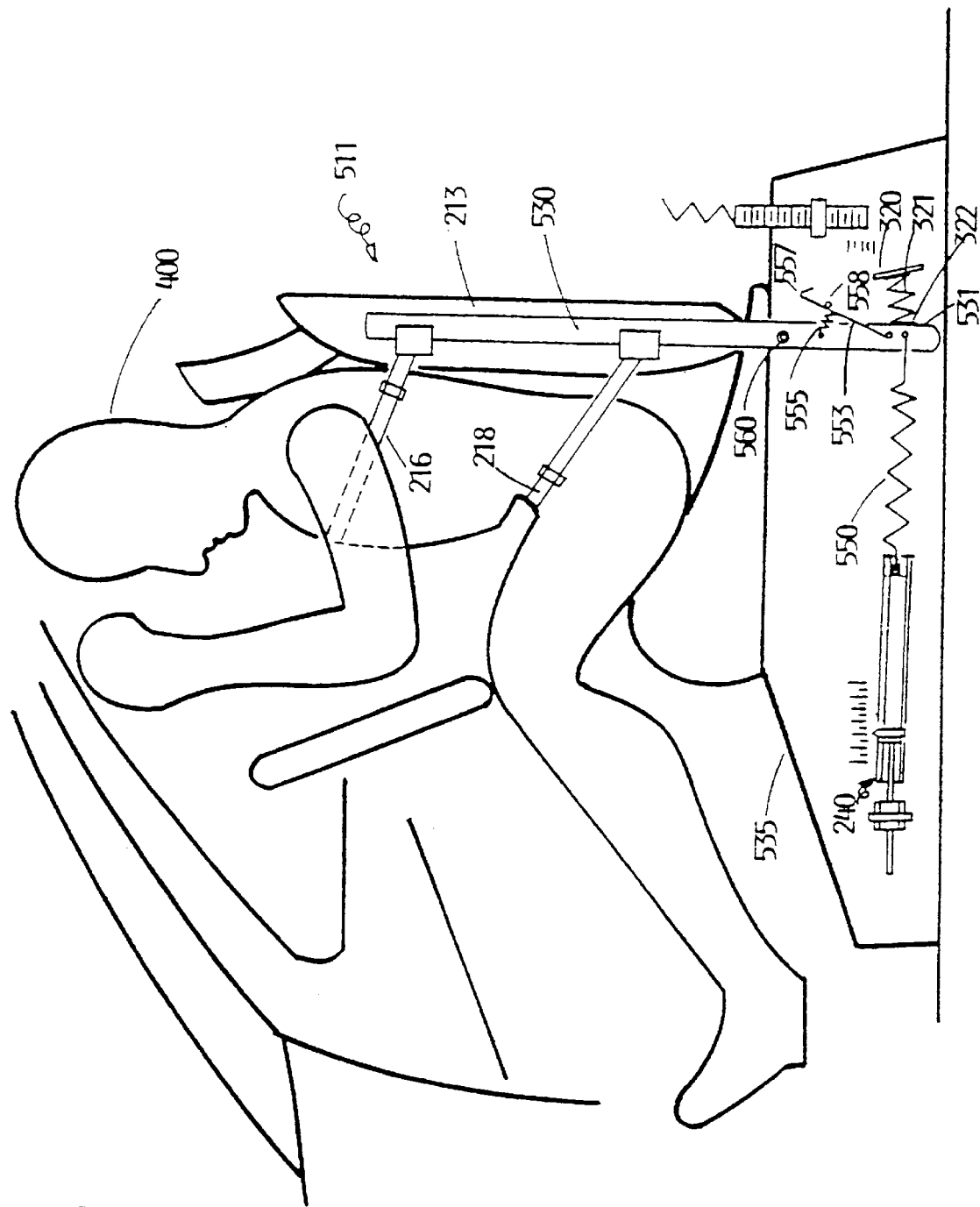
FIG. 20 shows the occupant, sitting on the automatic safety car seat of the tension spring type, when the collision velocity is 40 Km/h.

According to FIG. 20, in an event of frontal collision at the velocity of the car, 40 Km/h (which is also equal to the velocity of the occupant, $V_1$); the kinetic energy of a moving mass, i.e. the occupant 400 which is properly fastened with the safety-belts to the backrest 213, is converted to enormous impact energy. The belt tensioner 212 then automatically pulls the seat-belt tight in a space of milliseconds. The occupant 400 thrusts forward and pulls backrest 213 to move pivotally too. The occupant together with the backrest and the steel bar 530 are then pulled forward by this enormous impact energy with axle 560 as the pivoting axle of the steel bar 530. The tension force within the tension spring set 550 causes the deceleration of the moving mass until they all stop for a very short time. Thus the final velocity of the occupant $V_2$ is 0. In this situation the lowest part 531 of the steel bar 530 just touches the outermost spring coil 322 of the compression spring 321 where compression has not yet occurred. At this point as shown in FIG. 20, the spring 550 stretches out an additional length of 0.06 meter. Therefore, the length that spring 550 has been stretched from the original condition=$x_1$+0.06 meter.

Figure 22:
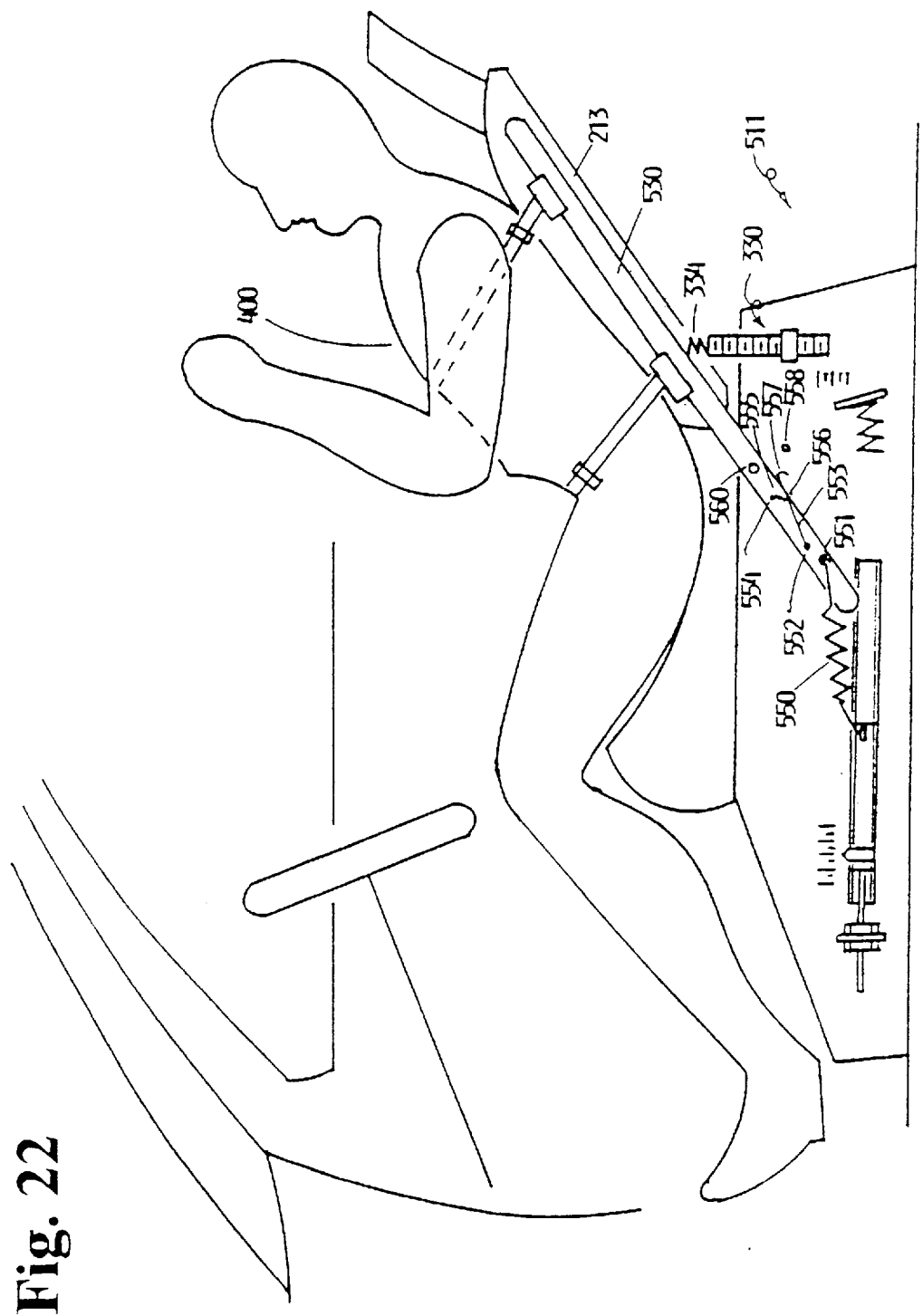
FIG. 22 shows the backrest of the automatic safety car seat of the tension spring type together with the occupant which have been drawn to recline backward to the rearmost, after the collision occurred at 40 Km/h or up.

As the steel bar is moving forward pivotally around the axle 560 of steel plate 535, the axle 558 pushes the hook 553 then upward and lifts the curving end 557 up until it is disengaged from the axle 558. The spring 555 thus draws the hook 553 away from the axle 558 to allow the drawing of the steel bar 530 together with the backrest 213 and the occupant 400 to recline backward as shown in FIG. 22 until the steel bar 553 compresses onto the compression spring 334 which functions as a force absorber.

Figure 21:
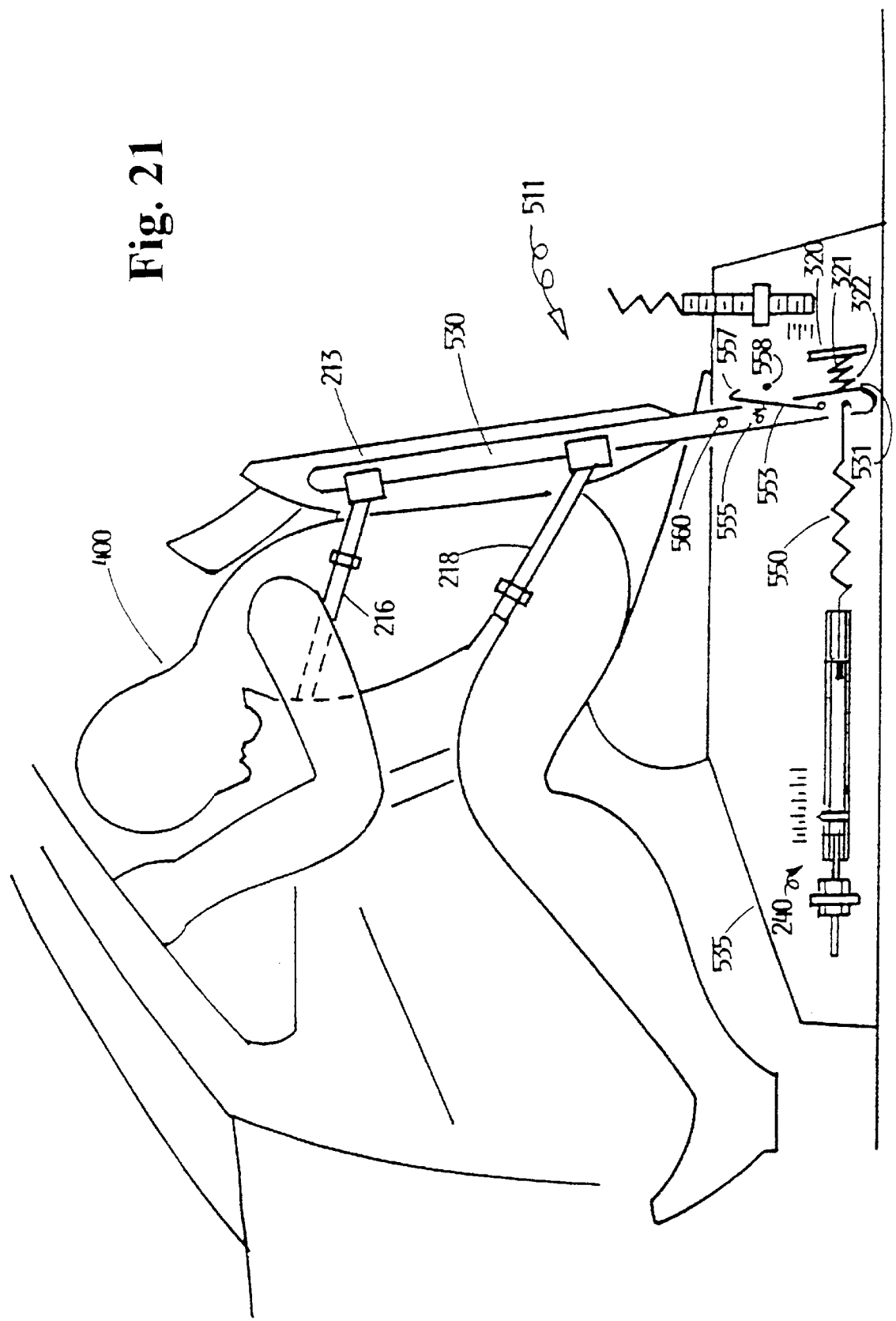
FIG. 21 shows the automatic safety car seat of the tension spring type together with the occupant, when the collision velocity is over 40 Km/h.

According to FIG. 21, in an event of frontal collision at any velocity above 40 Km/h no matter how great an impact energy resulting from the collision would be; the occupant 400 together with the backrest are pulled pivotally forward until the lowest part 531 of the steel bar 530 compresses the spring 321 tightly against the steel plate 320. The spring 321 functions to reduce the impact of steel bar 530 and halts the steel bar 530 together with the backrest 213 and the occupant 400 not to move any further, thus stop for a moment. In the mean time, the spring 555 has already pulled the hook 553 away from engaging with the axle 558. The tension spring 550 then pulls the axle 551 at the lower part of the steel bar 530 causing the pivoting movement of the steel bar 530 around the axle 560 to recline backward together with the backrest 213 and the occupant 400 as shown in FIG. 22 until the steel bar 530 presses on the spring 334 which is the force absorber.

Calculations for all the values, $x_1$, $x_2$ and F

From the work-energy equation, $$-\tfrac{1}{2}K\ (x_2^2-x_1^2)=\tfrac{1}{2}m(V_2^2-V_1^2)$$

or $$-\tfrac{1}{2}K\ (x_2^2-x_1^2)=\tfrac{1}{2}\ (M/2)(V_2^2-V_1^2)$$

where,

K is the linear stiffness of the tension spring, newtons per meter, i.e., the force in newtons that pulls the tension spring out 1 meter which is a constant for each spring set.

$x_1$ is the distance the tension spring is pulled extended by the force-adjusting set from the normal resting position when there has not yet been any forces exerted upon.

From the condition set above in FIG. 20, when a collision occurs at a velocity 40 Km/h, assuming $x_2=x_1+0.06$ meter $V_1=40$ Km/h, or=11.11 meters/sec $V_2=0$ From, $$-\tfrac{1}{2}K(x_2^2-x_1^2)=\tfrac{1}{2}\ (M/2)(V_2^2-V_1^2)$$

therefore, $$-\tfrac{1}{2}K\{(x_1+0.06)^2-x_1^2\}=\tfrac{1}{2}\ (M/2)(0^2-11.11^2)$$

$$-\tfrac{1}{2}K(0.12x_1+0.0036)=\tfrac{1}{2}\ (M/2)(0^2-11.11^2)$$

$$-\tfrac{1}{2}K(0.12x_1+0.0036)=-\tfrac{1}{2}\ (M/2)(123.4321)$$

$$\therefore \tfrac{1}{2}K(0.12x_1+0.0036)=\tfrac{1}{2}\ (M/2)(123.4321)$$

$$\tfrac{1}{2}K\ (0.12x_1+0.0036)=30.858M \qquad (1)$$

If,

M=120 Kg., $x_1$=0.1 meter therefore, $$\begin{aligned} 1/2K(0.12 \times 0.1 + 0.0036) &= 30.858 \times 120 \\ K &= 474{,}738.46 \text{ newtons/meter} \\ &= 474{,}738.46/9.81 \text{ Kg./meter} \\ &= 48{,}393.32 \text{ Kg./meter} \end{aligned}$$

Substitute K=474,738.46 newtons/meter in Equation (1) then, $$\tfrac{1}{2}\, 474{,}738.46(0.12x_1+0.0036)=30.858Mx_1=0.0010833M-0.03 \quad (2)$$

From Equation (2) when M is known, $x_1$ can be calculated and the value 2F can be calculated from the Equation $$2F = 2Kx_1$$

For example, if,

M=30 Kg.

From Equation (2), then $x_1$=0.00245 meter

Thus, $$\begin{aligned} 2F &= 2 \times 48{,}393.32 \times 0.00245 \\ &= 237.12 \text{ Kg.} \end{aligned}$$

if,

M=60 Kg.

From Equation (2), then $x_1$=0.03499 meter

Thus, $$\begin{aligned} 2F &= 2 \times 48{,}393.32 \times 0.03499 \\ &= 3{,}386.56 \text{ Kg.} \end{aligned}$$

Constructing of Scale 570 of the Automatic Safety Car Seat using Tension Spring Set

Before the construction of a scale 570 for adjusting the initial torsion force within the tension spring set, the value $x_1$ must be first calculated.

Table 2 in the following page shows the values of $x_1$ for the different occupants sitting on the automatic safety car seat of tension spring sets type, having the body weights of M from 30, 32, 34, 36, 38, . . . or 120 Kg.

In the calculation for all the values to construct the scale either for the seats of torsion or tension spring types described above, the body weights used in the calculation do not include the weight of the backrest which is negligible comparing with the body weight of the occupant. In case if the weight of the backrest is to be included in the calculation, then the total weight, W, must be used in the calculation instead of M, where the total weight, W=the body weight, M, of the occupant+the weight of the backrest of which the weight of the backrest is a constant value.

Figure 23:
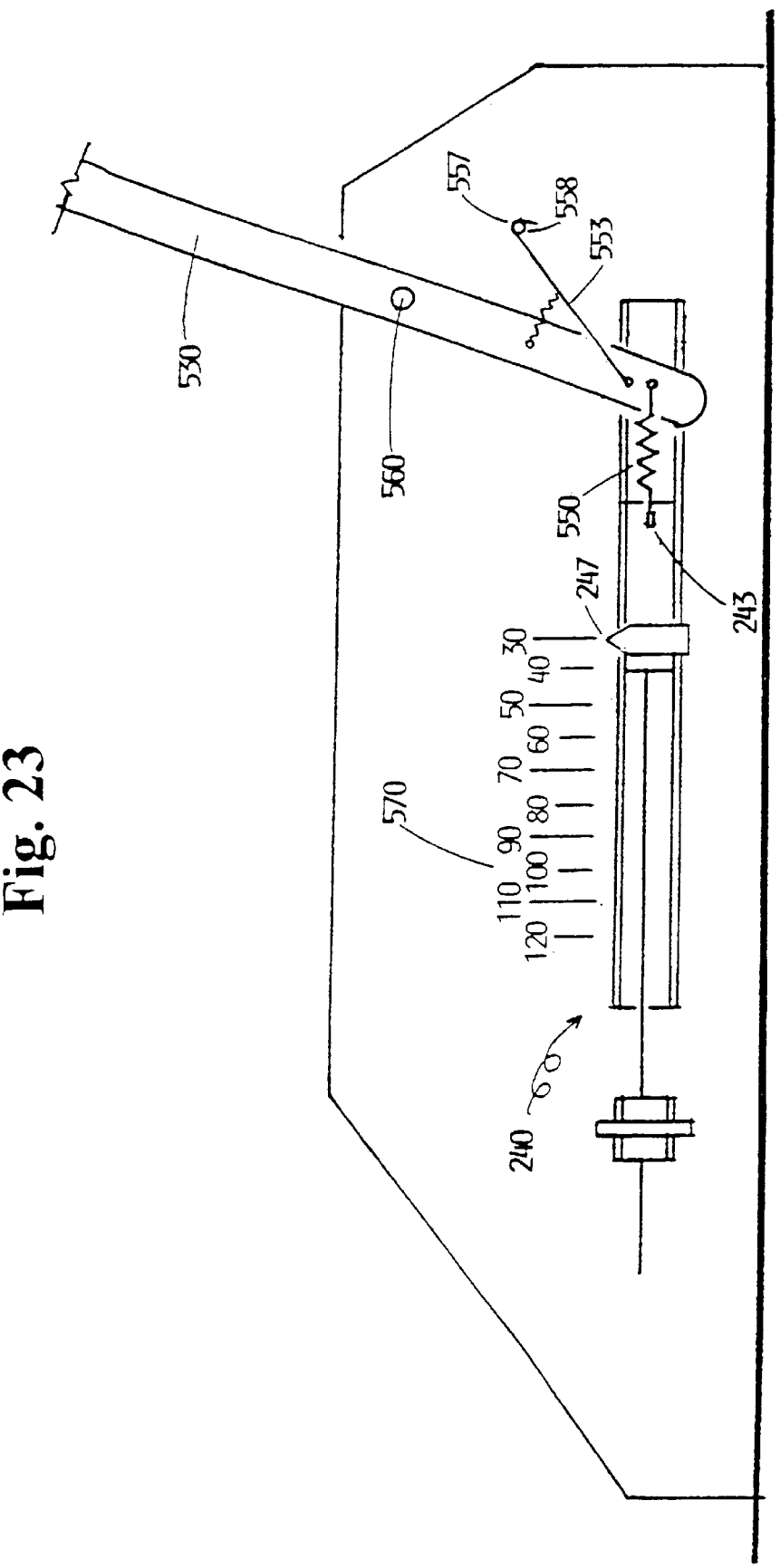
FIG. 23 shows how to draw a scale for adjusting the initial tension forces in the tension spring set corresponding to the different body weights of the occupants sitting on the automatic safety car seat.

After the value $x_1$ is obtained as shown in Table 2, the following steps must be performed, as shown in FIG. 23.

1. At all the time during the constructing of this scale 570, the curving end 557 of the hook 553 is engaged onto the axle 558 of the steel plate 535 to restrain the steel bar 580 in place.

2. Assuming that the occupant on this seat has the body weight of 30, 40, 50, 60, 70, 80, 90, 100, 110 or 120 Kg.

TABLE 2

| M Kilograms | $x_1$ Meters | M Kilograms | $x_1$ Meters | M Kilograms | $x_1$ Meters |
|---|---|---|---|---|---|
| 30 | 0.002499 | 60 | 0.034998 | 90 | 0.067497 |
| 32 | 0.004666 | 62 | 0.037165 | 92 | 0.069664 |
| 34 | 0.006832 | 64 | 0.039331 | 94 | 0.071830 |
| 36 | 0.008999 | 66 | 0.041498 | 96 | 0.073997 |
| 38 | 0.011165 | 68 | 0.043664 | 98 | 0.076163 |
| 40 | 0.013332 | 70 | 0.045831 | 100 | 0.078330 |
| 42 | 0.015499 | 72 | 0.047998 | 102 | 0.080497 |
| 44 | 0.017665 | 74 | 0.050164 | 104 | 0.082663 |
| 46 | 0.019832 | 76 | 0.052331 | 106 | 0.084830 |
| 48 | 0.021998 | 78 | 0.054497 | 108 | 0.086996 |
| 50 | 0.024165 | 80 | 0.056664 | 110 | 0.089163 |
| 52 | 0.026332 | 82 | 0.058831 | 112 | 0.091330 |
| 54 | 0.028498 | 84 | 0.060997 | 114 | 0.093496 |
| 56 | 0.030665 | 86 | 0.063164 | 116 | 0.095663 |
| 58 | 0.032831 | 88 | 0.065330 | 118 | 0.097829 |
|  |  |  |  | 120 | 0.10000 |

3. According to Table 2, when the body weight of the occupant is 30 Kg., as shown in FIG. 23, adjust the force adjusting set 240 to pull the tension spring 550 out for a distance of 0.002499 meter from the normal resting condition where there is no external force exerted upon, until the arrow head 247 moves to a position. At this position, draw a vertical line on the flat surface 535 and write a number "30".

4. From Table 2, when M is 40, 50, 60, 70, 80, 90, 100, 110 or 120 Kg., the value $x_1$ is 0.01333, 0.024165, 0.03499, 0.045831, 0.05666, 0.06749, 0.07833, 0.08916, and 0.1 meter, respectively. Do similarly as in 3., until the arrow head 247 moves to different positions on the steel plate 535. Draw the vertical lines at these different positions and write the numbers: 40, 50, 60, 70, 80, 90, 100, 110 or 120, respectively.

Thus, these numbers 40, 50, 60, 70, 80, 90, 100, 110 or 120 labeling the vertical lines represent the body weights of the occupant that he must adjust the force adjusting set 240 to pull the tension spring 550 out for a distance until the arrow head points right to the number corresponds to his body weight.

5. There are two of this scale 570, each on each steel plate on each side of the safety car seat and that the occupant needs to adjust on both sides to have the arrow head points to the number corresponds to his body weight.

6. In FIG. 23, the scale is labeled ranged only from 30 up to 120 since there is limitation in space.

The Automatic Safety Car Seats for the Occupants in the Rear Compartment of the Car

The two types of the automatic safety car seats described above are for the occupants sitting in the front compartment of the car, i.e. the driver and the front seat passenger. However, for the seat in the rear compartment of the car, slight modifications are necessary to make the invention fully served the purpose since the seats for the rear passengers available at present have the backrests which are fixed to a board right under the rear glass window. Most of the time this board may be made of fiberglass, cardboard, plastic or thin steel plate, and is covered with leather or thick fabric.

This automatic safety car seats for the rear compartment of the car has only a few components in addition to that of the front compartment and the board under the rear window needs to be modified to function best for this newly invented car seat.

Figure 24:
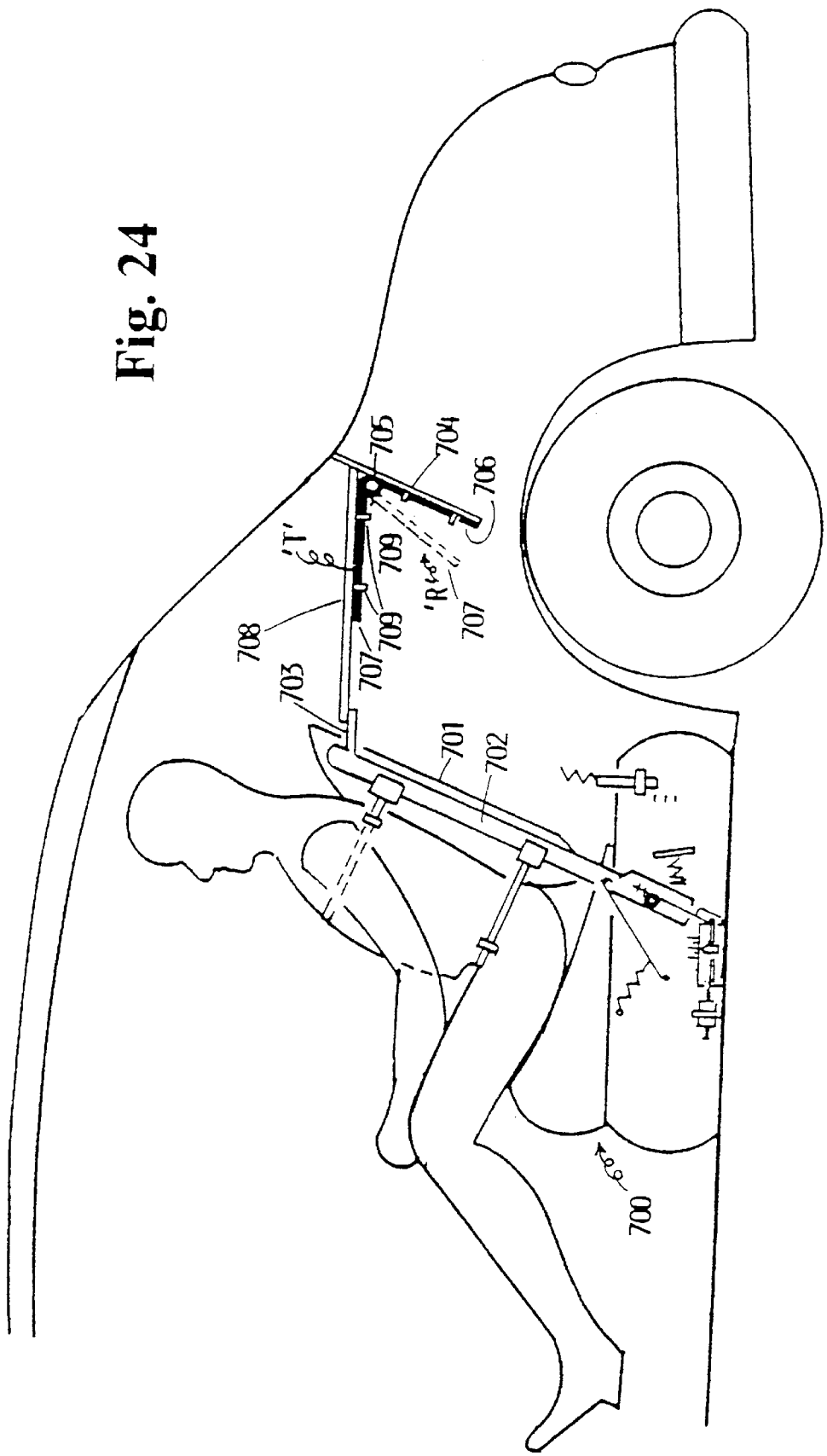
FIG. 24 shows the automatic safety car seat for the rearseat occupant together with the flap-plate under the rear glass window.
Figure 25:
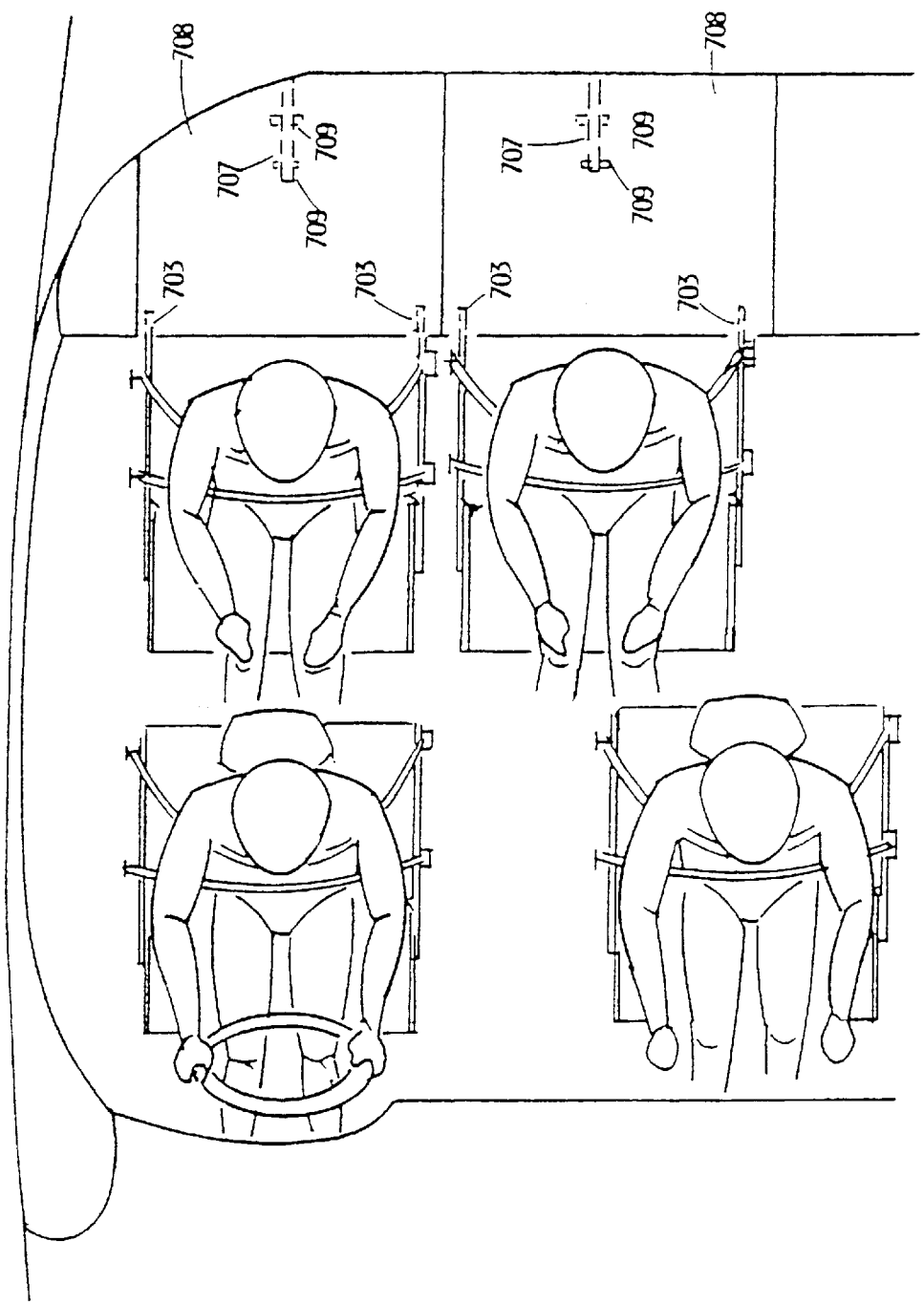
FIG. 25 is a top-view of the occupants in a vehicle, in both the front and the rear compartments together with the flap plate under the rear glass window.

As shown in FIG. 24 which is the side-view and FIG. 25 which is the top-view showing the occupants sitting on the automatic safety car seat 700 in the rear compartment of the car. The backrest 701 is flanked with the steel bars 702 on each side. This steel bar 702 is slightly different from the previously described steel bar 214 in that there is a short steel axle 703 projecting out about 5 centimeters rearwardly. This short steel axle 703 is an integral part of the steel bar 702.

The steel plate 704 is a plate that separates the trunk from the rear passenger compartment of the car on which the arm 706 of a torsion spring 705 is fixed to. The other arm 707 is at the position "R" which is in a normal condition where there is not any external force acted upon.

The board or the plate under the rear window are divided into several segments, all are given the number '708'. Each is used for each safety seat.

The plate 708 is placed with its front edge supported by the short steel axle 703 of the steel bar 702. The rear edge of this plate is supported by the steel plate 704 such that the plate 708 must be in horizontal position.

The arm 707 of the torsion spring 705 is pushed upwardly until it meets the plate 708. This arm 707 is then fixed tightly under the plate 708 with the two clamps 709. Assuming at this position, the arm 707 is at position 'T'.

As the arm 707 is pushed upwardly from the position 'R' to position 'T', there creates a great torsion force within the torsion spring set 705. But since the arm 707 which was pushed to fixed tightly with the steel plate 708 by the clamps 709, this torsion force then presses the plate 708 tightly onto the steel axle 703 of the steel bar 702 when the car is moving at a normal speed of 40 Km/h or higher where there is not yet any accident occurs.

Figure 26:
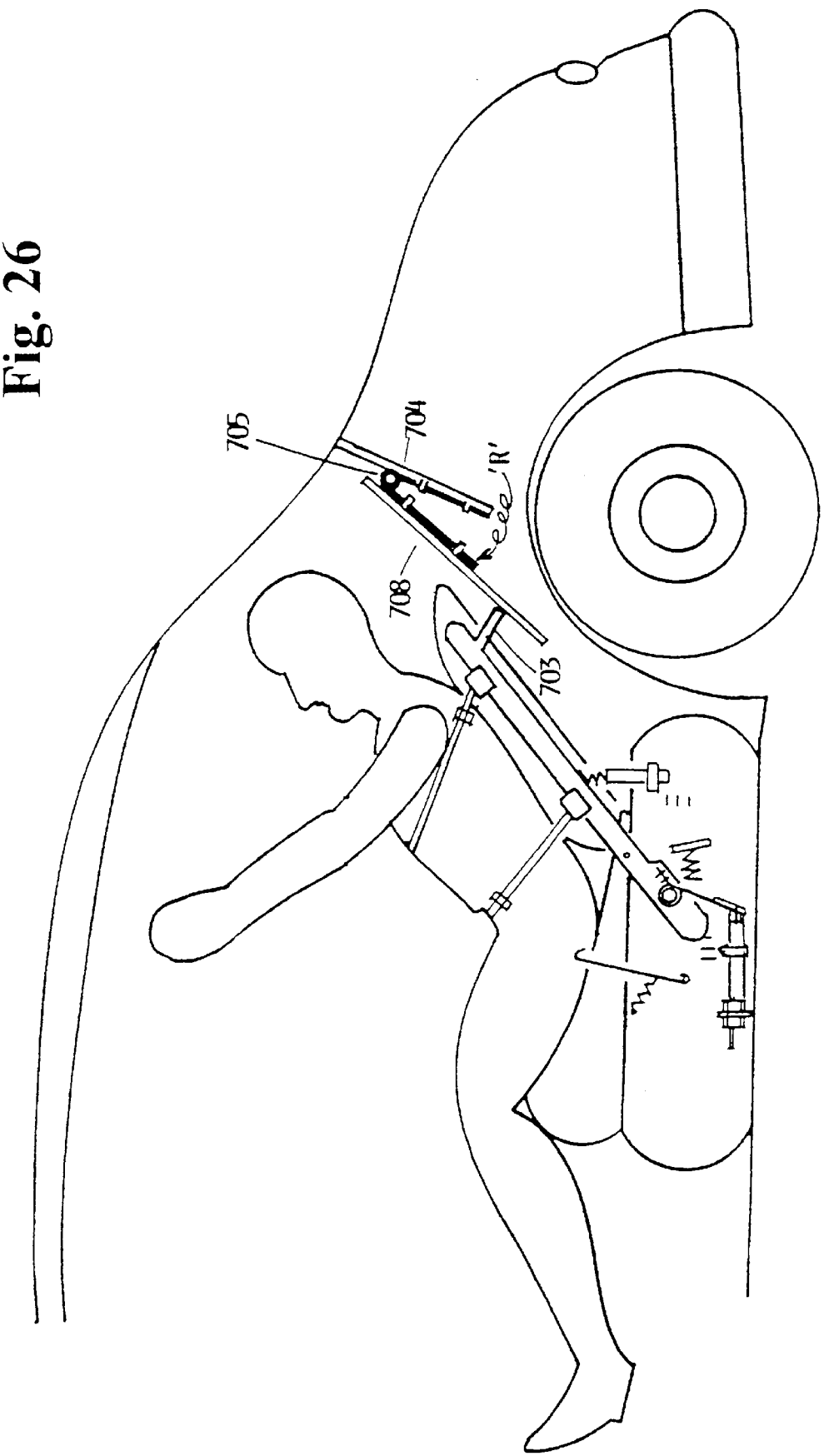
FIG. 26 shows the backseat occupant together with the backrest being pulled to recline backward to the rearmost after the collision occurred at 40 Km/h or up.

In an event of a frontal collision when the collision velocity is 40 Km/h or up, the occupant sitting on the rear safety seat together with the backrest 701 and the steel bar 702 thrust then forward. The plate 708 is then released from the steel axle 703. The torsion force in the torsion spring 705 then pulls the arm 707 together with the plate 708 down back to the original position 'R'. In the mean time, the occupant and the backrest 701 together with the steel bar 702 are pulled to recline backward as shown in FIG. 26.

This automatic safety rear car seat for the passenger sitting in the rear compartment can use either the torsion spring or the tension spring as the key mechanism to trigger the passive safety performing action.

As a result, every type of the automatic safety car seat the present invention described can provide passive safety for the passenger in a vehicle in an event of a frontal collision when the collision velocity is 40 Km/h or up. The seriousness of the injuries to the occupant to his body from his pelvis up to his head can thus be minimized or avoided.

The Testing to Show the Safety Providing Action of the Present Invention

The following test shows that in an event of a frontal collision velocity of 40 Km/h or up, the occupants both in the front and the rear compartments of a vehicle are pulled to recline backward together with the backrests. Thus, the striking of the upper part of the occupant body from the pelvis up to the head to any deforming frontal parts of car intruding by the collision action especially to the steering wheel part can be substantially avoided. The degree of seriousness of injuries can therefore be minimized.

As shown in FIG. 27, a car 800 is the car to be tested in this testing, having a dummy 801 sitting in the front compartment on the front automatic safety car seat 211 and a dummy 802 sitting in the rear compartment on the rear automatic safety car seat 700, both are fastened to the backrest with the presently designed automatic seat-belts. Each force-adjusting set 240 is adjusted to have the arrow head points at the number corresponds to the occupant's body weight.

The car 800 is tied at the frontal bumper with a cable 804. A car 803 is used for pulling the car 800. The cable 804 is to move freely through a rectangular hole 806 of a concrete wall 805 as shown in FIG. 29 which shows the cross-sectional view of the concrete wall 805 along the line Y—Y in FIG. 28. The length of this cable is 510 meters.

A position "P" is on the road which is at a distance of 500 meter away from the wall 805 on the side that the car 803 parks.

The car 803 parks at the wall having its rear end close to the wall. The other end 807 of the cable 804 is winded round an iron post 808 mounted vertically at the rear end of the car 803 as shown in FIG. 27. A man 809 sitting at the rear compartment of the car 803 is holding this end 807 of the cable 804 in a position ready for releasing.

At the starting of the test, the rear end of the car 803 is close to the wall 805; and the car 800 is pushed backward to stretch the cable 804 tight as far as possible as shown in FIG. 27.

The car 803 starts moving away from the wall 805 and speeds up to a higher velocity. The driver of the car 803 keeps the velocity of the car 803 constant at 40 Km/h as the car is moving to pull the car 800 and the two dummies 801 and 802 also move at the velocity of 40 Km/h.

As the front of the car 803 reaches the position 'P' on the road, the driver gives an audible signal to the man 809 at the rear compartment that he releases the cable end 807 he held. The cable 804 is then released from the post 808. At the same time, the car 800 collides right onto the wall 805 at a collision velocity of 40 Km/h, where the velocity of the wall is zero. This makes the frontal collision occurs at a relative velocity of 40+0=40 Km/h. as shown in FIG. 28. In the mean time, the car 803 moves pass the position 'P'.

The cable end 807 needs to be released to avoid the damage to the car 803.

After the inspection of the overall damage occurred to both dummies 801 and 802, the following results would be reported:

1. Both dummies are pulled to recline backward to the farmost together with the backrests and the flanking steel bars of the automatic safety car seats by the spring sets (FIG. 28).
2. There should be no wound or injury on the body of the dummies from the pelvis up to the head, thus the brain damage should be avoided.

The test can be performed in the same manner as above at any increasing velocity higher than 40 Km/h, and the result should be obtained similarly as in 1. and 2.

The dummies of different body weights can be used, and the force-adjusting set is adjusted correspondingly. The result should be the same as above.

At any velocities below 40 Km/h, the dummies together with the backrests and the flanking steel bars should not be pulled to recline backward.

Sheet-type Safety Belt

Figure 31:
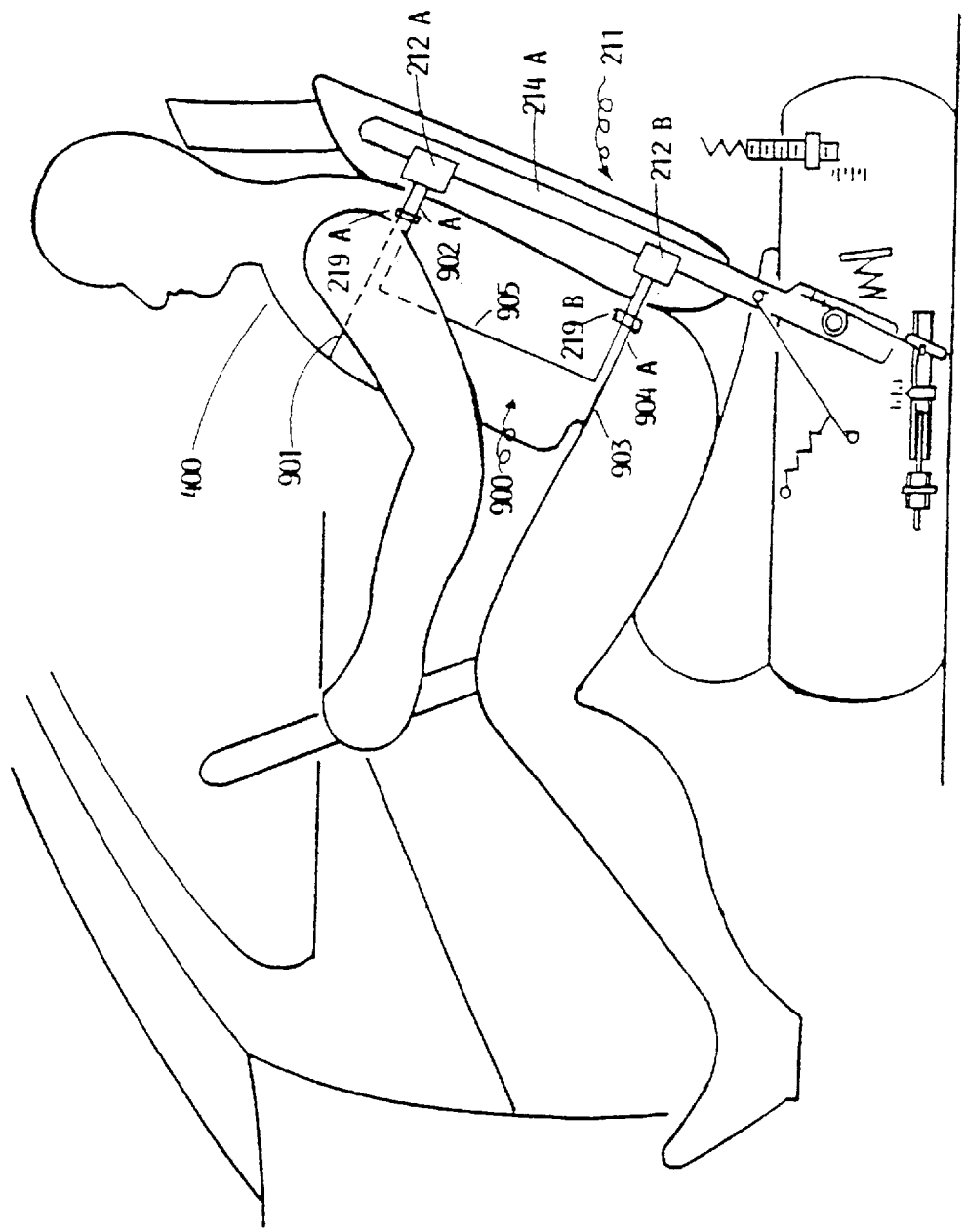
FIG. 31 shows an occupant fastened with the sheet-type safety seat-belt.

The safety seat-belts described above in the present invention or those conventional ones available all are made of durable material of about 5 centimeters in width. Most of the time, when a serious head-on collision occurs, the great impact resulted from the sudden deceleration force per unit area exerted upon the band of the safety-belt can reportedly cause unnecessary serious injuries to the safety-belt users like rib fracture or other forms of thorax injuries. Modification can be made to avoid these types of injuries by increasing the surface area of the safety-belt band such that an additional sheet of the same kind of material used to make the seat-belt is added in between the upper and the lower seat-belts previously described to fuse the two into one enlarged piece of safety-belt sheet 900 having two sets of strap locks one upper and one lower. The surface area of this modified safety-belt sheet 900 of the present invention is increased to cover from the chest of the occupant down to his abdomen. This sheet can be a plain sheet or a porous one to give better ventilation. The upper part 901 is connected to or constructed as a single piece with the upper strap band. The end 902A of the safety-belt band is connected to the belt tensioner 212A of the steel bar 214A via the strap lock 219A, as shown in FIG. 31.

The upper part 901 is connected on the opposite side to the safety-belt band 902B, where the other end of the safety-belt 902B is fixed to the axle 215 of the steel bar 214B.

The lower part 903 of the sheet 900 is connected to or constructed as a single piece with the safety-belt band 904A. The end 904A of the safety-belt band is connected to the belt tensioner 212B of the steel bar 214A via the strap lock 219B.

The lower part 903 is connected on the opposite side to the safety-belt band 904B, where the other end of the safety-belt 904B is fixed to the axle 217 of the steel bar 214B.

Figure 30:
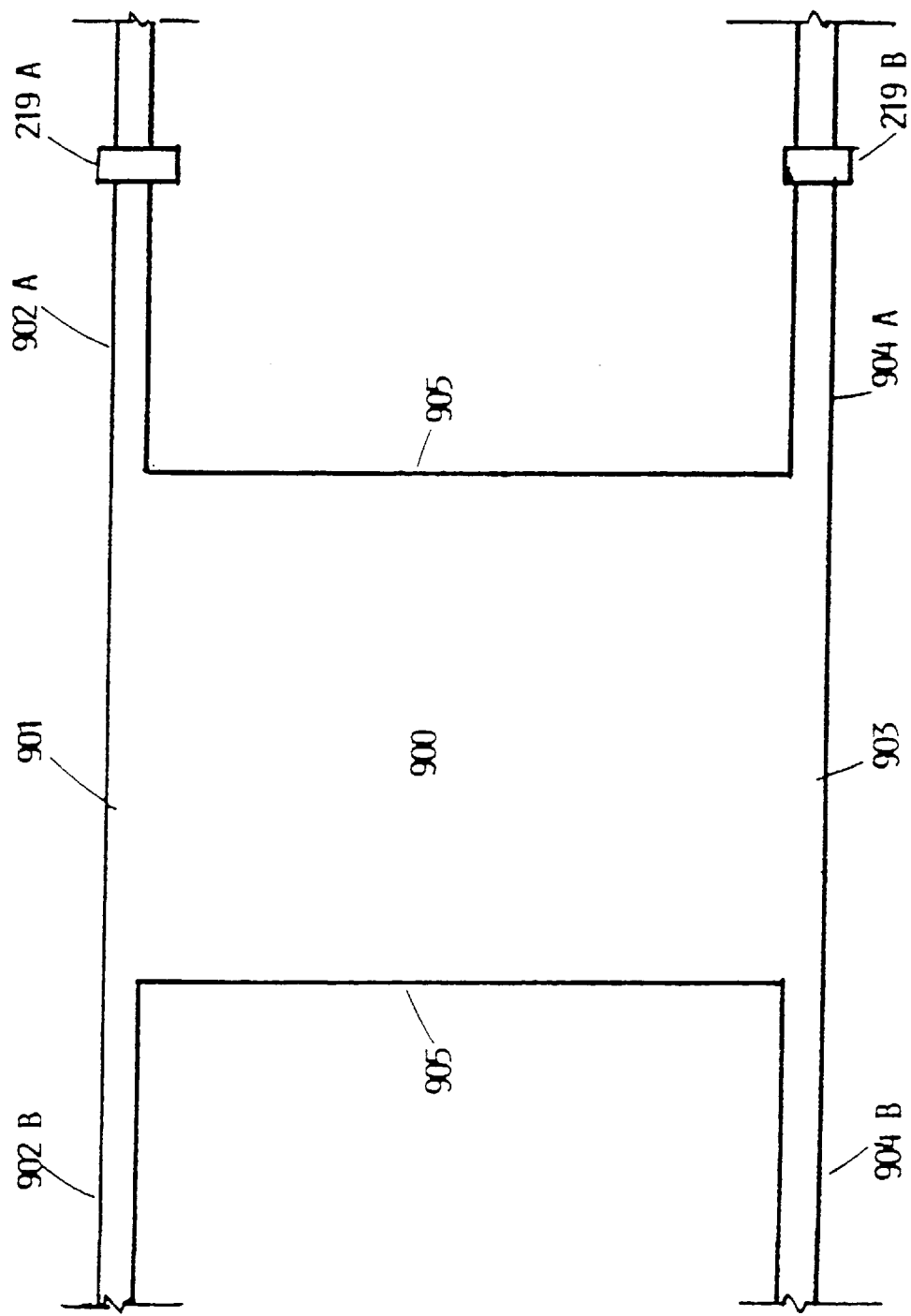
FIG. 30 is a sheet-type safety seat-belt of the present invention.

FIG. 31 shows the safety-belt sheet 900 when being used by an occupant. Both lateral rims 905 (shown in FIG. 30) spread all the way through and flank the trunk of the occupant.

During a brief duration of a frontal collision, an impact force exerts on the safety-belt sheet 900 by the abrupt deceleration of a moving occupant is enormous but spreaded on the entire area of the belt sheet 900 which is several times wider than the conventional safety-belts of the strap-type. The resulting impact force per unit area is therefore minimized to avoid causing the injury to the occupant.

Figure 32:
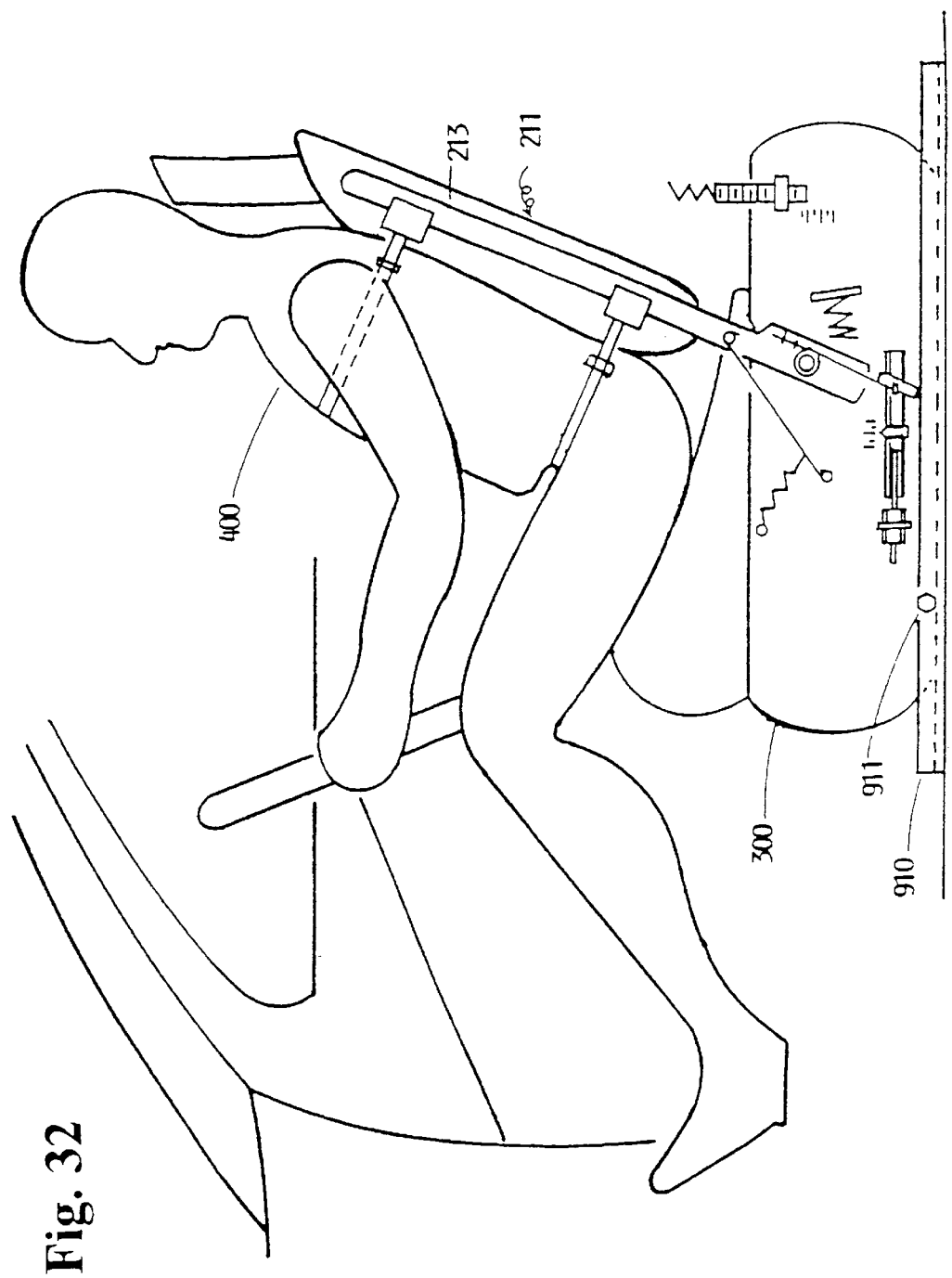
FIG. 32 shows how a front automatic safety car seat is installed on a slidable rail fixed to the floor of a car together with the locking device.

FIG. 32 shows that the steel plates 300 of the automatic safety car seat of the present invention can be alternatively placed on rails 910 and therefore are slidable to and fro on these rails and conventional locks of any types can be applied to fixed the seat to a position appropriate for each occupant.

It will be understood that changes may be made within the scope of this invention by one of ordinary skill in the art without departing from the spirit thereof. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

I claim:

1. An automatic safety seat for an occupant in a front compartment of a vehicle whose seat cushion remains stationary while its backrest can recline suddenly backward to the rearmost, by mechanical action of torsion springs, only upon a frontal collision of said vehicle, comprising:

a backrest that can recline backward together with an upper part of a body of said occupant only when a frontal collision occurs and only at a predetermined relative velocity or higher;

two long rectangular steel bars fixed tightly flanking on each side, one on the left side and one on the right side, to said backrest;

two automatic seat-belt tensioner sets on said steel bar on the left side of said backrest, an upper one at chest level and a lower one at pelvis level of said occupant;

two short steel axles on said steel bar on the right side of said backrest, an upper one at the chest level and a lower one at the pelvis level of said occupant;

a seat cushion placed relatively stationary at all time on and fixed tightly at its left and right edges to the top of two thick steel plates which are mounted perpendicularly and tightly to the floor of said vehicle;

two seat-belts of strap-type, each together with a strap-lock to fasten the upper part of an occupant's body to said backrest, where one seat-belt is at the chest level of said occupant with one end spooled inside the upper seat-belt tensioner set and the other end mounted tightly to said upper short steel axle on said right rectangular steel bar, while the other seat-belt is at the pelvis level of said occupant with one end spooled inside the lower seat-belt tensioner set and the other end mounted tightly to said lower short steel axle on said right rectangular steel bar;

an additional lowest short steel axle protruding out on each said bar flanking on each side of said backrest on the outer surface opposite to said backrest at a level relatively lower than said lower seat-belt tensioner set or said lower steel axle to be engaged with a hook, and a circular hole all the way through the thickness of said bar at a level relatively lower than said lowest short axle;

a cylindrical shaft protruding perpendicularly and integrally out laterally on the surface of each said thick plate, wherein each said cylindrical shaft can pivotally fit to said circular hole at the lower end of said bar, with the part of each said cylindrical shaft protruding out over said circular hole long enough to insert through the whole thickness of a torsion spring set with a length of at least one centimeter left, while an upper straight arm of said torsion spring set mounted tightly to each said bar with two clamps and a lower straight arm having a long loop end;

to the anterior of said shaft, there are two short steel axles mounted relatively at different oblique levels on said thick plate, an upper one located farther and a lower one located closer to said shaft;

a tension spring with one end winds round said upper short axle on said thick plate, while the other end of said tension spring is fixed to the middle of said hook whose upper curving hook end engaged to said lowest short axle on said bar with its tip points down in such a manner that there is enough tension force within said tension spring to lift said hook up and away when said curving hook end is disengaged from said steel axle where lower end of said hook winds pivotally round said lower short axle on said thick steel plate;

rearwardly and at a lower level relative to said cylindrical shaft, there is a small plate mounted up perpendicularly on the surface of said thick plate with a first compression spring set having one end fixed on the lateral surface of said small plate facing the front of said vehicle with its free end pointing towards the posterior of the lowest end of said rectangular bar such that said lowest end presses on said compression spring to reduce the impact and limit the angle at which said bar moves pivotally forward around said cylindrical shaft during a frontal collision of said vehicle;

rearwardly next to said first compression spring set and said small plate, there is a force-absorbing spring set mounted to the surface of said thick plate each consists of a thick block mounted perpendicularly onto the surface of each said thick plate having a circular hole with several turns of internal threads to mate with external threads of a vertical thick rod with a second compression spring set fixed on top whose level can be adjusted by turning said thick rod up or down to set a predetermined angle at which each of said two bars together with said backrest and said fastened occupant may pivotally recline backward to the rearmost as it presses on said second compression spring;

at a position relatively anterior and lower than said cylindrical shaft, there is a scale showing the numbers representing the body weights of the occupants on surface of said thick plate;

at a position relatively lower than said scale, there is a force-adjusting set fixed onto the surface of said thick plate consists of:

a rail of C-shaped cross-section of said force-adjusting spring set with its back mounted onto each said thick plate having a bar slidable and horizontally fitted along said rail where at the posterior end of said slidable bar there is a circular loop fixed laterally to be engaged to said long loop of lower arm of said torsion spring set, and relatively near the anterior end on the surface of said slidable bar there is a cursor made of whose arrow head points to a number on said scale indicating body weight of said occupant on said seat, and at the anterior end of said slidable bar there is a long rod extending as a single piece with its external threads to mate with internal threads of two hexagonal head nuts flanking a small plate mounted perpendicularly to said thick plate with a circular hole in the center through which said long rod inserts, where moving of said long rod to and fro horizontally is possible by adjusting said two hexagonal head nuts and that said occupant must adjust said two head nuts to pull said arrow head cursor to point at a number on said scale corresponds to his body weight before using said automatic safety seat.

2. An automatic safety seat for an occupant in a front compartment of a vehicle whose seat cushion remains stationary while its backrest can recline suddenly backward to the rearmost, by mechanical action of torsion springs, only upon a frontal collision of said vehicle of claim 11, whereof components are added for appropriate use of said safety seat in the rear compartment of said vehicle as follows:

a steel rod added to rear surface of each said steel bar flanking said backrest at a relatively upper position to support the front edge of a plate positioned horizontally under a rear glass window of said vehicle, where said plate under the rear glass window is segmented to be used for each of said safety seat having its front edge supported by said rods and its rear end is fixed to a straight arm of a torsion spring by two clamps while another straight arm of said torsing spring is fixed to a plate separating the rear passenger compartment and the luggage compartment of said vehicle in a manner that there is relatively sufficient torsion force within said torsion spring to press said former plate tightly onto both rods each of each said bar; and where moving away of both said rods from supporting under said plate under the rear glass window in an event of frontal collision by the pivoting movement of said both bars flanking said backrest pulled by said occupant thrusting forwards, causes said plate to move down pivotally by the torsion force within said torsion spring to allow enough room for said backrest together with its fastened occupant to recline backward to the rearmost.

* * * * *